United States Patent
Watson et al.

(10) Patent No.: US 11,167,678 B2
(45) Date of Patent: *Nov. 9, 2021

(54) PASSENGER SEAT PAIRING SYSTEMS AND METHODS

(71) Applicant: PANASONIC AVIONICS CORPORATION, Lake Forest, CA (US)

(72) Inventors: Philip Watson, Lake Forest, CA (US); Steven Bates, Mission Viejo, CA (US); Sanjiv Sitaram Pimple, Irvine, CA (US)

(73) Assignee: PANASONIC AVIONICS CORPORATION, Lake Forest, CA (US)

( * ) Notice: Subject to any disclaimer, the term of this patent is extended or adjusted under 35 U.S.C. 154(b) by 174 days.

This patent is subject to a terminal disclaimer.

(21) Appl. No.: 16/530,620

(22) Filed: Aug. 2, 2019

(65) Prior Publication Data

US 2019/0356741 A1 Nov. 21, 2019

Related U.S. Application Data

(63) Continuation of application No. 15/458,001, filed on Mar. 13, 2017, now Pat. No. 10,412,173, which is a
(Continued)

(51) Int. Cl.
*B60N 2/90* (2018.01)
*B60N 2/56* (2006.01)
(Continued)

(52) U.S. Cl.
CPC ............ *B60N 2/90* (2018.02); *B60N 2/0224* (2013.01); *B60N 2/56* (2013.01); *G08C 17/02* (2013.01);
(Continued)

(58) Field of Classification Search
CPC .......... B60N 2/44; B60N 2/0224; B60N 2/56; B60R 11/0229; B60R 11/0252; B60R 2011/0012; H04L 67/125; H04N 21/2146
See application file for complete search history.

(56) References Cited

U.S. PATENT DOCUMENTS 7,300,102 B2   11/2007  Gupta et al.
8,806,521 B2   8/2014   Keen
(Continued)

FOREIGN PATENT DOCUMENTS

CN   203254985 U   10/2013
CN   103809613 A   5/2014
(Continued)

OTHER PUBLICATIONS

Office Action dated Nov. 11, 2019 in Russian Application No. 2016115659/11(024634) (14pages).
(Continued)

*Primary Examiner* — Michael J Zanelli
(74) *Attorney, Agent, or Firm* — Perkins Coie LLP

(57) ABSTRACT

Systems and methods for pairing a personal electronic device of a passenger with a passenger seat in a vehicle using a PWM light identification, and for allowing the personal electronic device to control passenger in-seat functions and features. The system comprises an on-board video system having an in-seat display system for installation in a vehicle. The on-board video system is configured to communicate a PWM light identification from a monitor of the in-seat display system which is captured by an imaging device of the personal electronic device. The on-board video system receives pairing information from the personal electronic device corresponding to the captured light identification via a wireless communication link. The on-board video system then validates the pairing information and pairs the personal electronic device to the passenger seat and autho-
(Continued)

rizes the personal electronic device to control passenger seat functions associated with the passenger seat.

20 Claims, 9 Drawing Sheets

Related U.S. Application Data continuation-in-part of application No. 14/693,541, filed on Apr. 22, 2015, now Pat. No. 9,694,725.

(51) Int. Cl.
  *H04L 29/08* (2006.01)
  *B60N 2/02* (2006.01)
  *G08C 17/02* (2006.01)
  *H04W 4/48* (2018.01)
  *B60R 11/00* (2006.01)

(52) U.S. Cl.
  CPC ............ *H04L 67/125* (2013.01); *H04W 4/48* (2018.02); *B60R 2011/0012* (2013.01); *G08C 2201/20* (2013.01)

(56) References Cited

U.S. PATENT DOCUMENTS

| | | | |
|---|---|---|---|
| 8,823,852 B2 | 9/2014 | Yamada et al. |
| 8,908,074 B2 | 12/2014 | Oshima et al. |
| 8,913,144 B2 | 12/2014 | Oshima et al. |
| 8,922,666 B2 | 12/2014 | Oshima et al. |
| 8,957,791 B2 | 2/2015 | Macrae |
| 8,965,216 B2 | 2/2015 | Oshima et al. |
| 8,988,574 B2 | 3/2015 | Oshima et al. |
| 8,994,841 B2 | 3/2015 | Oshima et al. |
| 8,994,865 B2 | 3/2015 | Oshima et al. |
| 9,003,454 B2 | 4/2015 | Keen |
| 9,008,352 B2 | 4/2015 | Oshima et al. |
| 9,019,412 B2 | 4/2015 | Oshima et al. |
| 9,030,585 B2 | 5/2015 | Oshima et al. |
| 9,083,543 B2 | 7/2015 | Oshima et al. |
| 9,083,544 B2 | 7/2015 | Oshima et al. |
| 9,085,927 B2 | 7/2015 | Oshima et al. |
| 9,087,349 B2 | 7/2015 | Oshima et al. |
| 9,088,360 B2 | 7/2015 | Oshima et al. |
| 9,088,362 B2 | 7/2015 | Oshima et al. |
| 9,088,363 B2 | 7/2015 | Oshima et al. |
| 9,094,120 B2 | 7/2015 | Oshima et al. |
| 9,143,339 B2 | 9/2015 | Oshima et al. |
| 9,166,810 B2 | 10/2015 | Oshima et al. |
| 9,184,838 B2 | 11/2015 | Oshima et al. |
| 9,203,515 B2 | 12/2015 | Oshima et al. |
| 9,225,420 B2 | 12/2015 | Oshima et al. |
| 9,247,180 B2 | 1/2016 | Oshima et al. |
| 9,252,878 B2 | 2/2016 | Oshima et al. |
| 9,258,058 B2 | 2/2016 | Oshima et al. |
| 9,262,954 B2 | 2/2016 | Oshima et al. |
| 9,281,895 B2 | 3/2016 | Oshima et al. |
| 9,287,977 B2 | 3/2016 | Oshima et al. |
| 9,294,188 B2 | 3/2016 | Oshima et al. |
| 9,294,666 B2 | 3/2016 | Oshima et al. |
| 9,300,845 B2 | 3/2016 | Oshima et al. |
| 9,331,779 B2 | 5/2016 | Oshima et al. |
| 9,341,014 B2 | 5/2016 | Oshima et al. |
| 9,377,638 B2 | 6/2016 | Aoyama et al. |
| 9,377,639 B2 | 6/2016 | Aoyama et al. |
| 9,380,227 B2 | 6/2016 | Oshima et al. |
| 9,407,368 B2 | 8/2016 | Oshima et al. |
| 9,413,460 B2 | 8/2016 | Oshima et al. |
| 9,438,340 B2 | 9/2016 | Oshima et al. |
| 9,443,423 B2 | 9/2016 | Aoyama et al. |
| 9,450,672 B2 | 9/2016 | Oshima et al. |
| 9,456,109 B2 | 9/2016 | Oshima et al. |
| 9,462,173 B2 | 10/2016 | Oshima et al. |
| 9,467,225 B2 | 10/2016 | Oshima et al. |
| 9,515,731 B2 | 12/2016 | Oshima et al. |
| 9,694,725 B2 | 7/2017 | Watson et al. |
| 9,849,988 B2 | 12/2017 | Carles |
| 10,412,173 B2 | 9/2019 | Watson et al. |
| 2010/0224727 A1 | 9/2010 | Bauer |
| 2011/0314487 A1 | 12/2011 | Keen et al. |
| 2013/0005336 A1 | 1/2013 | Ayotte |
| 2013/0330088 A1 | 12/2013 | Oshima |
| 2014/0094143 A1 | 4/2014 | Ayotte |
| 2014/0163774 A1 | 6/2014 | Demeniuk |
| 2014/0242910 A1 | 8/2014 | Umlauft |
| 2014/0282684 A1 | 9/2014 | Keen |
| 2015/0003357 A1 | 1/2015 | Schreiber |
| 2015/0017915 A1 | 1/2015 | Hennequin |
| 2018/0170550 A1 | 6/2018 | Streckert et al. |

FOREIGN PATENT DOCUMENTS

| | | |
|---|---|---|
| CN | 104010348 A | 8/2014 |
| CN | 106067838 A | 11/2016 |
| CN | 108569409 A | 9/2018 |
| EP | 2770787 | 8/2014 |
| EP | 3086301 A1 | 10/2016 |
| GB | 2511887 | 9/2014 |
| JP | 2010-126143 | 6/2010 |
| RU | 2323106 C2 | 4/2008 |
| RU | 2716517 C2 | 3/2020 |

OTHER PUBLICATIONS

CN201610245213.X Office Action and Search Report dated Oct. 10, 2020.
The extended European search report dated Sep. 15, 2016 in European Application No. 16153941.6-1855, Applicant: Panasonic Avionics Corporation (8pages).
Boden, Rian, Thales Shows off Airline Seat with NFC, NFC World, Apr. 14, 2014, Published online at URL htt;://www.nfcworld.com/2014/04/14/328796/thales-shows-airline-seat-nfc/.

PASSENGER SEAT PAIRING SYSTEMS AND METHODS

CROSS-REFERENCE TO RELATED APPLICATIONS

This application is a continuation of co-pending U.S. patent application Ser. No. 15/458,001, filed on Mar. 13, 2017, which is a continuation-in-part application from prior, co-pending U.S. patent application Ser. No. 14/693,541, filed on Apr. 22, 2015. Priority to the foregoing prior patent applications is expressly claimed, and the disclosure of the prior applications is hereby incorporated herein by reference in their entirety and for all purposes.

BACKGROUND

The field of the invention generally relates to in-seat functions and features for vehicles, and more particularly, to systems and methods for pairing a passenger's personal electronic device with a passenger seat using a light identification communication such that the personal electronic device can be used to control passenger in-seat functions and features such as entertainment systems (e.g., video/audio programming), comfort systems (e.g., seat adjustment), and environmental systems (e.g., air conditioning) in vehicles.

Many vehicles of common carriers, such as airplanes, passenger trains, buses, cruise ships, and the like, have individualized functional equipment dedicated to a particular passenger seat which can be utilized by the passenger, such as adjustable seats, adjustable environmental controls, adjustable lighting, telephony systems, video and/or audio entertainment systems, crew communication systems, and the like. For example, many commercial airplanes have individualized video and audio entertainment systems, often referred to as "in-flight entertainment" or "IFE" systems.

As one example of a passenger seat function, the entertainment systems for passenger carrier vehicles, such as commercial airlines, often have video displays installed at each passenger seat. For instance, video displays may be provided at each passenger seat, such as mounted at each of the seatbacks of the passenger seats, and/or on cabin walls and/or deployable from an armrest for seats located at a bulkhead, i.e., in the first row of a section. Many of these systems allow each passenger to select from multiple video channels and/or audio channels, or even individually select and play videos from a library of videos. These video displays may also provide access to games, communication applications (e.g., telephone service, messaging, etc.), internet browsing, and other computer applications. Sometimes such displays are referred to as smart monitors due to the ability to provide computer applications and process and store data internally.

To operate the seat functions, such as an individualized audio/video system, controls are provided on or near the passenger seat that allow the passenger to control the seat functions. The controls may be physical buttons, or on-screen interfaces displayed, for instance, on the video display of the entertainment system. For example, some commercial airplane entertainment systems have on-screen interfaces for controlling a reading light, activating a crew member call signal, as well as controlling the audio/video entertainment.

It has become quite commonplace for travelers to carry personal electronic devices having wireless communication capability, such as cellular phones, smart phones, tablet computers, laptop computers, and other portable electronic devices. This includes passengers traveling on all types of transportation including the vehicles of common carriers, such as airplanes, passenger trains, buses, cruise ships, sightseeing vehicles (e.g., ships, boats, buses, cars, etc.). Many of these personal electronic devices have the capability to execute application software programs ("apps") to perform various functions, including controlling other devices and systems.

Accordingly, U.S. Patent Application Publication No. 2015/0017915 to Hennequin, et al., has proposed establishing a communication link between a mobile electronic device of a passenger with a local base installed in the aircraft and associated with a particular seat. The mobile electronic device can then control various functional equipment via the communication link using a control software application installed on the mobile electronic device. A pairing of the mobile electronic device to the local base is performed when the mobile electronic device is placed in the proximity of the local base using near field communication ("NFC"), Bluetooth or Apple iBeacon™, or by scanning a barcode on the local base using an optical component of the mobile electronic device. However, this method allows anyone to pair their mobile electronic device with the local base for the particular seat and control the functional equipment for the seat, even if such person is not assigned to and/or sitting in such seat.

Similarly, U.S. Patent Application Publication No. 2015/0017915 to Ayotte proposes establishing a communication link between a mobile electronic device of a passenger and an NFC terminal installed at a particular seat in the aircraft. The NFC module is connected to a central passenger communication system. Pairing of the mobile electronic device to the passenger communication system is accomplished by the mobile electronic device sending a message having registration information (e.g., a PIN) to the passenger communications system via the NFC terminal. The passenger communications system then validates the registration information, such as by comparing the PIN to an expected PIN or to information corresponding to the PIN stored in the passenger communications system. The mobile electronic device can then control various functional equipment via the communication link using an interface having a menu or list of services and features presented to the passenger on the mobile electronic device.

U.S. Pat. No. 8,806,521 to Keen, et al., has proposed pairing a passenger's mobile electronic device to a vehicle in-flight entertainment system by displaying a barcode on the video display at a particular passenger seat and scanning the barcode with a camera in a passenger's personal electronic device. The system is limited to providing and redeeming an in-flight coupon, and does not control any seat functions using the personal electronic device. Moreover, it is undesirable to utilize the display of in-flight entertainment system for pairing because it may be turned off, not installed, or otherwise unavailable (such as during the display of messages or other content).

SUMMARY

In one embodiment, the present invention is directed to an innovative system for pairing a passenger's personal electronic device (also referred to as a "PED") with a seat in a vehicle for controlling seat functions for the passenger using the personal electronic device. The passenger seat may be in any type of vehicle, but typically a common carrier vehicle such as a commercial airplane, passenger train, bus, ship, ferry, etc. The personal electronic device may be any suitable electronic device, such as a mobile/cellular phone, mobile/cellular smart phone, tablet computer, personal computer, laptop computer, or other portable handheld or other suitable portable electronic device. Smart phones are particular well-suited because they are commonplace, especially with travelers, and they typically have a great deal of functionality.

The passenger seat pairing system comprises an on-board management system configured to be installed in the vehicle. Of course, if the on-board management system is configured to be installed in the vehicle, it may also be actually installed in the vehicle. The on-board management system comprises a data server having a processor, memory and data storage, an on-board/vehicle wireless communication module and a management software application. The vehicle wireless communication module is configured to establish a wireless communication link with a wireless communication module of the personal electronic device, and receive information transmitted from the personal electronic device via the wireless communication link.

The system also comprises a device pairing software application configured to program the personal electronic device to provide the required functionality for the overall system. The device pairing software application is stored on a non-transitory computer program carrier, such as a hard-drive, server, CD, CD-ROM, DVD, etc. The device pairing software application will typically be made available for download and/or installation onto the personal electronic, such as through a website accessible via the internet or an application ("app") store, such as iTunes™, or the like. The personal electronic device itself is not necessarily an element of the system, but may be part of the system, as described further below. The device pairing software application is configured to program the personal electronic device for certain functionality depending on the embodiment, as explained below.

In embodiments in which the system includes the personal electronic device of a passenger, the personal electronic device has a processor, memory, a wireless communication module, and a device pairing software application. The wireless communication module is configured to establish a wireless communication link with an on-board management system installed on the vehicle. For example, the wireless communication module may be a cellular base module, a Wi-Fi module, an NFC module, a Bluetooth module, or other suitable wireless communication transceiver system.

The passenger seat pairing system may also include one or more seat function controllers for controlling one or more passenger seat functions associated with the particular passenger seat of the passenger. For instance, the seat function controller may be configured to control seat functions such as controlling an on-board entertainment system (e.g., IFE), an air conditioning system, a seat lighting system, a seat adjustment system, a service call system, and the like. The seat function controller receives instructions, such as an electronic signal, and controls the seat function based on the instructions.

In one embodiment, the system is configured to pair the personal electronic device to the particular passenger seat occupied by the passenger using an electronic boarding pass received by, and stored on, the personal electronic device. A boarding pass generally includes, or is associated with, a particular passenger seat of the passenger, such as a seat number or seat location, as well as passenger information such as the passenger's name, and travel information such as route number (e.g., flight number), departure date and time, destination, optically readable ticket code (e.g., QR code or bar code), passenger loyalty code or frequent flyer number, etc. In such case, the on-board management system is configured to receive pairing information from the personal electronic device via the wireless communication link, in which the pairing information includes a passenger seat identifier identifying the passenger seat of the passenger and a personal electronic device identifier identifying the personal electronic device. The on-board management system is also configured to pair the electronic device to the passenger seat using the pairing information and authorize the personal electronic device to control at least one passenger seat function associated with the passenger seat. The term "pair", and other grammatical forms such as "pairing", means that the personal electronic device is associated with a passenger seat such that communications received by the on-board management system from the personal electronic device are recognized as being related to that passenger seat and/or such communications control seat functions associated with that passenger seat. In some cases, the seat function is uniquely associated with that passenger seat.

In the boarding pass embodiment, the device pairing software application is configured to program the personal electronic device to receive the electronic boarding pass, determine the passenger seat from the electronic boarding pass, and transmit the pairing information including the passenger seat and the personal electronic device identifiers to the on-board management system via the wireless communication link. The device pairing software application is also configured to program the personal electronic device to transmit a control instruction to control the at least one passenger seat function. For example, the application may display a user interface on a display of the personal electronic device that allows the passenger to control the passenger seat function. For example, the user interface may be for controlling a video entertainment system having a smart monitor installed in the vehicle proximate the passenger seat. Thus, the user interface may include video selection options, and video playback controls such as "play," "fast forward," "reverse," as well as volume controls, etc. When the passenger interacts with the interface, the personal electronic device transmits instructions for controlling the passenger seat function based on the selections by the passenger on the user interface. The seat function controller then controls the seat function based on the instruction.

In another feature of the system, the seat function controller may be controlled via the on-board management system. For instance, the seat function controller may be a component separate from the on-board management system, and/or it may comprise a passenger services system separate from, and in communication with, the on-board management system. In such case, the instruction transmitted by the personal electronic device may be received by the on-board management system via the wireless communication link. The on-board management system then sends a management system instruction to the seat function controller (e.g., a passenger service system) that controls the seat function based on the instruction. In such case, the on-board management system receives the instruction transmitted from the personal electronic device and then sends a management system instruction based on the instruction to the seat function controller and/or personal services system. The seat function controller and/or passenger services system are configured to receive the management system instruction and control the seat function based upon a management system instruction received from the on-board management system which is based upon the control instruction received from the personal electronic device. Alternatively, the seat function controller may be integrated with the on-board management system such that the on-board management system is configured to receive the instruction from the personal electronic device and to control the seat function based upon the instruction.

Alternatively, the instruction transmitted by the personal electronic device may be received directly by the seat function controller.

In another embodiment of the passenger seat pairing system, a passenger manifest is referenced to pair the personal electronic device to a particular passenger seat on the vehicle. The on-board management system is configured to receive and store passenger manifest data including each passenger identity associated with a respective passenger seat for each passenger. The on-board management system is further configured to receive pairing information from the personal electronic device including passenger identification data and a personal electronic device identifier identifying the personal electronic device via the wireless communication link. The on-board management system is configured to determine the passenger identity and a passenger seat assigned to the passenger on the passenger manifest using the passenger identification data and the passenger manifest. Finally, the on-board management system can pair the electronic device to the passenger seat and authorize the personal electronic device to control at least one passenger seat function associated with the passenger seat.

The device pairing software application may be similar to the application described for the above embodiment, except that it is configured to program the personal electronic device to access passenger identification data and transmit pairing information including passenger identification data and a personal electronic device identifier to the on-board management system via the wireless communication link. The device pairing software application in this embodiment is also configured to program the personal electronic device to transmit a control instruction to control the at least one passenger seat function, the same as, or substantially similar to, the boarding pass embodiment described above. Alternatively, the device pairing application may be a generic factory installed application that accesses a website on the onboard management system that allows the passenger to enter the pairing information.

The passenger manifest embodiment may also include the additional features and aspects of the embodiments described above, such as the seat function controller, inclusion of the personal electronic device, and the various configurations of the on-board management system, seat function controller, and personal services system.

In yet another embodiment, a system for pairing a personal electronic device of a passenger with a passenger seat in a vehicle is provided. The system includes an on-board management system for installation in a vehicle, in which the on-board management system includes a server and a vehicle wireless communication module configured to establish a wireless communication link with the personal electronic device. The on-board management system is further configured to receive and store a passenger manifest including an assigned passenger seat for each passenger and the identity of each passenger. In addition, a webpage is hosted by the on-board management system and accessible by the personal electronic device via the wireless communication link for the passenger to communicate to the on-board management system a request to pair the personal electronic device with a seat and passenger identification data.

After the on-board management system receives the request and passenger identification data, the on-board management system determines whether a passenger seat is assigned to the passenger based upon the passenger identification data and the passenger manifest, and if so, pairs the personal electronic device to the assigned passenger seat based upon a personal electronic device identifier associated with communications from the personal electronic device, and authorizes the personal electronic device to control at least one passenger seat function associated with the assigned passenger seat.

In still another embodiment of the passenger seat pairing system, a seat identification device may be utilized to pair the passenger's personal electronic device with the passenger's seat. A seat identification device is configured to be located proximate each passenger seat and is also configured to communicate a passenger seat identification identifying the particular passenger seat proximate the respective seat identification device. The passenger seat identification communicated by the passenger seat identification device can be detected by the personal electronic device of the passenger. As some examples, the seat identification device may be an NFC terminal, radio frequency identification tag ("RFID tag"), a Bluetooth module, optically readable code, or the like. Accordingly the device pairing software application is configured to program the personal electronic device to receive a radio signal, or read an optical code, depending on the type of passenger seat identification device.

The on-board management system is configured to receive pairing information from the personal electronic device including a passenger seat identifier which is based on the passenger seat identification obtained from the seat identification device, and a personal electronic device identifier identifying the personal electronic device. The on-board management system is configured to pair the personal electronic device to the passenger seat using the pairing information, and authorize the personal electronic device to control at least one function associated with the passenger seat.

Again, the device pairing software application is similar to the application of the embodiments described above, except that it is configured to program the personal electronic device to detect the passenger seat identification from the passenger seat identification device. Similar to above, the device pairing software application is configured to program the personal electronic device to transmit pairing information including a passenger seat identifier based on the passenger seat identification from the seat identification device, and the personal electronic device identifier to the on-board management system via the wireless communication link. The device pairing software application in this embodiment is also configured to program the personal electronic device to transmit a control instruction to control the at least one passenger seat function, the same as, or substantially similar to, the boarding pass embodiment described above.

The seat identification device embodiment may also include the additional features and aspects of the embodiments described above, such as the seat function controller, inclusion of the personal electronic device, and the various configurations of the on-board management system, seat function controller, and the passenger service system.

In yet another embodiment of an on-board passenger seat pairing system for pairing a passenger's personal electronic device with a seat in a vehicle for controlling seat functions, an innovative light identification displayed on a monitor installed at the passenger's seat may be used to facilitate the pairing. The passenger seat pairing system includes an on-board video system (e.g., an IFE system) comprising an on-board management system, same or similar to that described above. The on-board video system also has an in-seat display system installed at the seat. The on-board video system has a video monitor and may also have a computing device for processing audio/video entertainment. The in-seat display system is in operable communication with the on-board video system, such as network communication or bus communication. For instance, the vehicle may have a central on-board management system in network communication with in-seat display systems installed at each seat of the vehicle. Alternatively, the on-board management system and in-seat display system may be integrated with together, or there may be an on-board management system installed at each seat and operably coupled to a respective in-seat display.

The on-board video system is configured to communicate with the monitor a light identification associated with the seat which can be captured by an imaging device of a passenger's personal electronic device. The light identification is a pulse width modulation communication produced by modulating a backlight of the monitor. Systems and methods for displaying a pulse width modulation communication by modulating a light, such as a backlight of a monitor, is described in U.S. Pat. No. 9,166,810, filed on May 24, 2013, which is hereby incorporated by reference herein in its entirety. For example, the light identification may encode a binary code corresponding to a seat code associated with the seat. The code is converted into a pulse width modulated flashing pattern of the backlight, typically in frequency range from 1 kHz-20 kHz. The light identification communication has a number of significant advantages over other means of transmitting a seat identification code. The light identification communication has a faster response time compared to many radio frequency communications, such as Bluetooth communication, and other optical code reading methods, such as QR codes, bar codes, and the like. The light identification communication generally does not require linking, pairing, or signing in with username and/or password, such as required by Bluetooth, Wi-Fi, and the like.

In this regard, the personal electronic device includes a device pairing software application, similar to that described above, which programs the personal electronic device to receive the light identification displayed on the monitor using an imaging device of the personal electronic device, such as a camera taking image(s) of the light identification. The personal electronic device may process the image(s) of the light identification, including decoding the light identification. The personal electronic device generates a light identification code corresponding to the light identification. The personal electronic device then sends pairing information, including the light identification code corresponding to the light identification and a personal electronic device identifier identifying the personal electronic device to the on-board video system via the wireless communication link.

The on-board video system is configured to receive the pairing information from the personal electronic device via the wireless communication link. The on-board video system determines whether the light identification code received from the personal electronic device is valid. In other words, it determines whether the light identification code corresponds to the light identification displayed on the monitor. When the light identification code is valid, then the on-board video system pairs the personal electronic device to the seat and authorize the personal electronic device to control at least one passenger seat function associated with the seat.

Once paired and authorized, the personal electronic device sends control instructions to the on-board management system via the wireless communication link, and the on-board management system controls at least one passenger seat function based upon the control instructions received from the personal electronic device. For instance, the passenger seat pairing system may include one or more seat function controllers configured to control seat functions such as controlling an on-board entertainment system (e.g., IFE), an air conditioning system, a seat lighting system, a seat adjustment system, a service call system, and the like. The seat function controller receives the control instructions via the on-board video system, and controls the seat function based on the instructions.

In another aspect of the light identification embodiment, after receiving a light identification codes corresponding to the light identification displayed on the monitor, the on-board video system may be configured to block any other personal electronic devices from using the light identification to pair to the particular seat. This is a security feature which prevents someone else from using the same light identification to pair to the particular seat, such as a neighboring passenger who points the camera on their personal electronic device at the first passenger's monitor.

In still another aspect, the light identification embodiment may also utilize the passenger manifest to validate the pairing. In this case, the pairing information sent by the personal electronic device also includes passenger identification data, such as the passenger name (which may be encrypted or converted into a code), stored by the device pairing software application. Thus, the on-board video system also receives the passenger identification data from the personal electronic device via the wireless communication link. The on-board video system is also configured to store passenger manifest data including each passenger identity associated with each passenger's assigned passenger seat. The on-board video system then attempts to validate the passenger's personal electronic device for pairing to the seat before pairing and authorizing the personal electronic device. The on-board video system uses the passenger manifest to determine whether the passenger identification data and the seat associated with the light identification correspond to a passenger identity and associated assigned passenger seat on the passenger manifest. In other words, the system determines whether the personal electronic device attempting to pair to the particular seat belongs to the passenger having the assigned passenger seat. The system is configured to only pair the personal electronic device and authorize the personal electronic device to control seat functions when the passenger identification data and the seat associated with the light identification correspond to a passenger identity and associated assigned passenger, i.e., the pairing of the personal electronic device to the particular seat is validated by the passenger manifest. If they do not correspond, the pairing is denied.

Another embodiment of the present is directed to methods for pairing a passenger's personal electronic device with a seat in a vehicle for controlling seat functions using the light identification communication. In one embodiment, the method comprises displaying on a monitor installed at the seat of the passenger a light identification associated with the seat via a pulse width modulation communication produced by modulating a backlight of the monitor. Pairing information is received from the personal electronic device via a wireless communication link. The pairing information includes a light identification code corresponding to the light identification received by the personal electronic device and a personal electronic device identifier identifying the personal electronic device. It is then determined whether the light identification code received from the personal electronic device is valid. For instance, the validity of the light identification code may be determined by determining whether the light identification code matches a seat code corresponding to the seat attempting to be paired. When the light identification code received from the personal electronic device is determined to be valid, then the personal electronic device is paired to the seat and is also authorized to control at least one passenger seat function associated with the seat. When the light identification code is invalid, the pairing and authorization are denied.

In additional aspects of the method of pairing using light identification communication, the method may include any of the additional aspects and features described herein for the system on-board passenger seat pairing system utilizing light identification communication.

In still another aspect of the present invention, any of the passenger seat pairing systems described herein may be installed in a vehicle, such as an aircraft, train, automobile, bus or other vehicle. Furthermore, although the embodiments described above are applied to pairing a single personal electronic device to passenger seat for the passenger, typically the systems may perform the same functionality to pair a personal electronic device to a passenger's seat for a plurality of passengers, including up to pairing all of the passengers on a vehicle.

BRIEF DESCRIPTION OF THE DRAWINGS

The foregoing and other aspects of embodiments are described in further detail with reference to the accompanying drawings, wherein like reference numerals refer to like elements and the description for like elements shall be applicable for all described embodiments wherever relevant, wherein.

DETAILED DESCRIPTION

Figure 1:
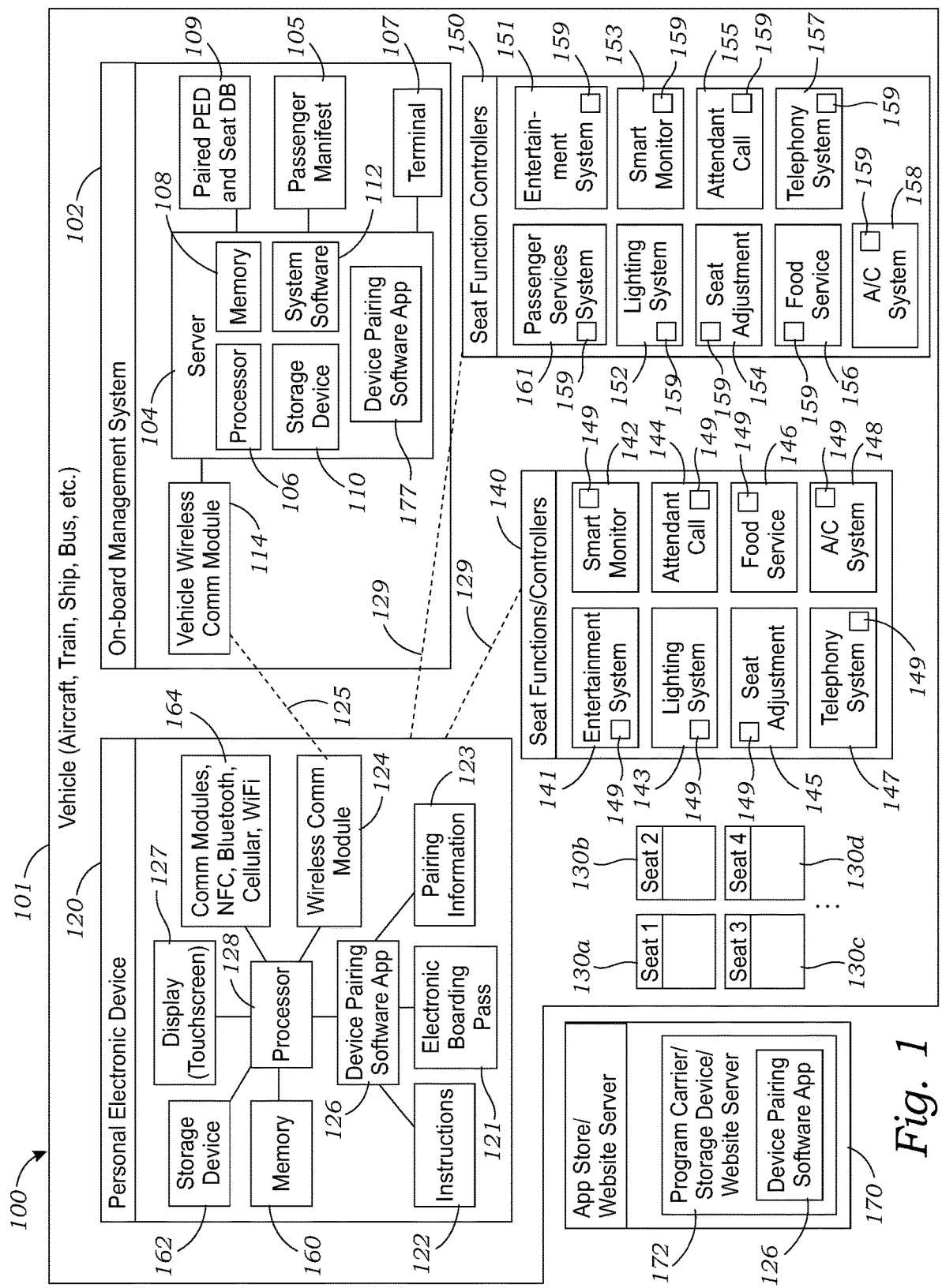
FIG. 1 is a block schematic diagram of a system for pairing a personal electronic device to a particular passenger seat in a vehicle, according to one embodiment of the present invention.

The present invention is directed to systems for pairing a personal electronic device of a passenger with a passenger seat, and controlling a seat function associated with that passenger seat. Referring to FIG. 1, a schematic diagram of one embodiment of a passenger seat pairing system 100 is shown. The system 100 comprises an on-board management system 102 which is configured to be installed in the vehicle 101. The on-board management system 102 is a computer system for operating various functions on the vehicle 101. For example, the on-board management system 102 may comprise an audio/video entertainment system, an on-board internet service system, and/or other on-board electronic system.

The on-board management system 102 comprises a server 104 which may simply be a computer or information processing device to serve the request of other programs and/or computing devices (i.e., a client). The server 104 comprises one or more computer processors 106, memory 108, one or more storage devices 110 for electronically storing digital files, such as a hard drive or solid-state drive (SSD), and system software 112 for programming the server 104 to perform the functions of the on-board management system 102 as described in more detail below.

The on-board management system 102 also comprises a vehicle wireless communication module 114 in operable communication with the server 104, such that server 104 may communicate wirelessly with other devices, such as a personal electronic device 120. The vehicle wireless communication module 114 may be any suitable wireless communication module, such as a Wi-Fi module, an NFC module, a Bluetooth module, a cellular base module, or other suitable wireless communication transceiver system. Typically, the vehicle wireless communication module 114 is a Wi-Fi module because virtually all personal electronic devices 120 have a Wi-Fi communication module for connecting to a Wi-Fi network.

Alternatively, the vehicle wireless communication module 114 may comprise a plurality of wireless communication modules, such as a plurality of Wi-Fi modules, NFC modules or Bluetooth modules distributed throughout the vehicle 101. For instance, an NFC module may be provided at each passenger seat 130 within the vehicle 101, or several Wi-Fi or Bluetooth modules may be spaced about the vehicle 101 to provide adequate signal strength to communicate with personal electronic devices 120 located throughout the vehicle. Aircraft frequently include one or more wireless access points (WAPs). The plurality of vehicle wireless communication modules 114 are each in operable communication with the server 104, such as through a local area network or other suitable network.

The vehicle wireless communication module 114 is configured to establish a wireless communication link 125 with the personal electronic device 120, such as a link with a wireless communication module 124 of the personal electronic device 120. The wireless communication module 124 is of the same type and operates on a compatible communication standard as the vehicle wireless communication module 114, such as Wi-Fi, Bluetooth, NFC, etc.

The on-board management system 102 is configured, at least partly by the system software 112 programming the system 102, to receive pairing information 123 from the personal electronic device via the wireless communication link 125. The pairing information 123 includes a passenger seat identifier which identifies the passenger seat (e.g., seat 130a) of the passenger as assigned on an electronic boarding pass accessed by the personal electronic device 120. The passenger seat identifier may be the actual seat number or a code associated with the passenger seat 130a. The pairing information also includes a personal electronic device identifier which identifies that personal electronic device for pairing with the passenger seat 130a. For example, the personal electronic device identifier may be a passenger name of the passenger having the personal electronic device 120, a code generated by a device pairing software application 126 executing on the personal electronic device 120, a serial number or other identifying code for the personal electronic device 120 (e.g., wireless communication address, international mobile station equipment identity ("IMEI",) mobile equipment identifier ("MEID"), SIM card identifier, media access control address, etc.).

The on-board management system 102 is further configured and programmed to pair the personal electronic device 120 with the passenger seat 130a identified by the passenger seat identifier using the pairing information 123. As defined above, the term "pair", and other grammatical forms such as "pairing", means that the personal electronic device is associated with a particular passenger seat 130 such that communications received by the on-board management system 102 from the personal electronic device 120 are recognized as being related to that passenger seat 130 and/or such communications control seat functions 140 associated with the particular passenger seat 130.

In addition, the on-board management system 102 authorizes the personal electronic device 120 to control one or more passenger seat functions 140 associated with the particular passenger seat 130. As some examples, the on-board management system 102 may authorize the personal electronic device 120 by accepting instructions 122 from the personal electronic device 120 to control the seat functions 140, by setting an authorization setting within the on-board management system 102, the personal electronic device 120, the seat functions 140, and/or the seat function controllers 150, to allow the personal electronic device to control seat functions 140, or by other suitable means of allowing the personal electronic device 120 to control the passenger seat functions 140. Upon pairing the personal electronic device 120, the on-board passenger system 102 may write a pairing record to a paired personal electronic device and passenger seat database 109.

The system 100 further comprises the device pairing software application 126 which is configured to program the personal electronic device 120. The device pairing software application 126 is stored on a non-transitory computer program carrier, such as a hard drive, CD, CD-ROM, DVD, flash memory, or other storage device, etc. For example, the device pairing software application 126 may be stored on a storage device 172 of an application store ("App Store") 170 such as that operated by Apple, Inc. under the trademark ITUNES, the application store operated by Google, Inc. under the trademark GOOGLE PLAY, or the application store operated by Microsoft Corporation under the trademark WINDOWS STORE. Alternatively, it may be a website server for a website 170 operated by a provider of the on-board management system 102 such as the manufacturer or a carrier operating the vehicle 101 (e.g., a commercial airline, train operator, cruise line, bus line, etc.). The device pairing software application 126 may also be stored on the on-board management system 102 such as in the storage device 110. In any case, the device pairing software application 126 is made available for download to the personal electronic device 120. Once downloaded onto the personal electronic device 120, the device pairing software application 126 is installed on the personal electronic device 120, and the installed version of the device pairing software application 126 is stored on the personal electronic device 120 such as in a storage device 162 of the personal electronic device 120.

The device pairing software application 126 is configured to program the personal electronic device 120 to perform the required functionality of the personal electronic device 120, as described below. In this first embodiment of the system 100, the device pairing software application 126 is configured to program the personal electronic device 120 to receive the electronic boarding pass 121, such as from the carrier operating the vehicle 101, or from a travel agent which sold the travel ticket associated with the electronic boarding pass 121. The electronic boarding pass 121 typically includes, or is associated with, a particular passenger seat of the passenger, such as a seat number or seat location, as well as passenger information such as the passenger's name, and travel information such as route number (e.g., flight number), departure date and time, destination, optically readable ticket code (e.g., QR code or bar code), passenger loyalty code or frequent flyer number, etc. The device pairing software application 126 may be configured to receive the electronic boarding pass 121 through an authenticated communication with the issuer of the electronic boarding pass 121. For instance, the device pairing software application 126 may require a user to provide log-in credentials (e.g., username and/or password), which the application 126 transmits to an internet web server system of the issuer. The web server system verifies the credentials, and only upon verification the web server system sends the electronic boarding pass 121 to the device pairing software application 126 on the personal electronic device 120.

The device pairing software application 126 accesses passenger seat data identifying the passenger seat from the electronic boarding pass 121. The device pairing software application 126 then transmits the passenger seat identifier, which may be the same passenger seat data accessed from the electronic boarding pass, or it may generate a passenger seat identifier which is recognizable by the on-board management system 102 based on passenger seat data accessed from electronic boarding pass. The application 126 also accesses the personal electronic device identifier, which may be accomplished by reading an identifier from the personal electronic device 120 or by generating a personal electronic device identifier.

The device pairing software application 126 is also configured to program the personal electronic device 120 to transmit the pairing information 122 including the passenger seat identifier and the personal electronic device identifier to the on-board management system 102 via the wireless communication link 125.

The device pairing software application 126 is also configured to program the personal electronic device 120 to control the passenger seat functions 140. As described more fully below, the passenger seat functions 140 are associated with a passenger seat 301 and may include such functions as an entertainment system 141, a smart monitor 142, a lighting system 143, an attendant call system 144, a seat adjustment system 145, a food service system 146, telephony service 147, an air conditioning system 148, or other comfort or convenience function for a passenger. The device pairing application 126 includes a seat function control module which allows the passenger to select a particular seat function 140 from a menu of seat functions 140 to control. Upon selection of the desired seat function 140, the application 126 displays a user interface for the selected seat function 140. For example, for an entertainment system 141, the application 126 displays on the touchscreen display 127 of the personal electronic device 120 various control screens. For example, an entertainment options screen may display video programming (e.g., movies, television shows, etc.), and audio programming from which the passenger can select desired programming using the application 126 on the passenger's personal electronic device 120. The application 126 may also include a screen for audio/video controls that the passenger can operate on the touchscreen display 127 (or other user input device on the personal electronic device 120, such as a keypad, joystick, touchpad, mouse, input buttons, etc.) to control audio/video playback, such as play/pause, fast forward, reverse, volume controls, etc. The application 126 includes a user interface having one or more control screens for controlling the respective seat function 140.

The device pairing software application 126 is configured to program the personal electronic device 120 to transmit control instructions 122 for controlling the seat function 140 based on the passenger's operations on the user interface for a seat function. As described below, the system 100 may be configured in various ways for the instructions 122 transmitted by the personal electronic device 120 to control the seat functions 140.

In one aspect, the system 100 is configured for the personal electronic device 120 to transmit the control instructions 122 to the on-board management system 102 via the wireless communication link 125. The on-board management system 102 is configured to receive the control instructions 122 from the personal electronic device 120 and then transmit a management system instruction to a seat function controller 150 for the particular seat function 140 being controlled or directly to the particular seat function 140 (e.g., the seat function 140 may have an integrated seat function controller or may not require a seat function controller). In another aspect, the seat function controllers 150 may be integrated with the on-board management system 102 or the seat function controllers 150 may be separate from the on-board management system 102. In the case of an on-board management system that transmits a management system instruction to a seat function controller 150, the seat function controller 150 then controls the seat function 140 based on the management system instruction. The management system instruction may be the same control signal as the control instruction 122, or it may be a different signal generated by the on-board management system 102 based upon the control instruction 122.

In another way of controlling the seat functions 140 from the personal electronic device 120, the personal electronic device 120 and the seat functions 140 and/or seat function controllers 150 may be configured to establish a seat function wireless communication link 129 directly between the personal electronic device 120 and the seat functions 140 and/or seat function controllers 150. The seat function wireless communication link 129 may utilize any suitable wireless communication, such as Wi-Fi, NFC, Bluetooth, cellular, etc. In such case, the seat functions 140 and/or seat function controllers 150 comprise a wireless communication module 149, and wireless communication module 159, respectively.

Each of the seat functions 140 may be operably coupled to a respective seat function controller 150, which controls the seat function 140. For example, the system 102 may have an entertainment system controller 151, a lighting system controller 152, a smart monitor controller 153, a seat adjustment controller 154, an attendant call controller 155, a food service controller 156, a telephony system controller 157, an air conditioning system controller 158, and other controllers 150 for any other seat functions 140. Each seat function 140 may have a dedicated seat function controller 150, or multiple, or even all, seat functions 140 may be controlled by a single seat function controller 150. In other words, two or more seat function controllers 150 may be integrated into a single seat function controller 150. For instance, a passenger services system 161 may be a seat function controller 150 for a plurality of seat functions 140, such as attendant call 144, food service 146, and entertainment system 149.

As explained above, the personal electronic device 120 is not necessarily an element of the system 100, but in certain embodiments it may be an element of the system 100. The personal electronic device 120 may be any suitable electronic device which is sufficiently portable that a passenger may carry it onto the vehicle and utilize it while at the passenger's seat 301. The electronic device 120 must also be configured for wireless communication with the on-board management system 102, and/or in some embodiments, the seat functions 140 and/or seat function controllers 150 using a wireless communication module 124. As some examples, the personal electronic device 120 may be a mobile/cellular phone, smart phone, tablet computer, personal computer, laptop computer, or other suitable handheld or portable electronic device. The personal electronic device 120 comprises a processor 128, memory 160 (e.g., RAM, DRAM, ROM, etc.), a storage device 162 (e.g., hard drive, flash memory, SSD, etc.), and a display 127 (e.g., LCD display, LED display, OLED display, etc.), input device(s) 127 (e.g., touchscreen, mouse, touchpad, keypad, buttons, etc.). The personal electronic device 120 may also include wireless communication modules 164 in addition to the wireless communication module 124, such as an NFC module, Bluetooth module, cellular base module, Wi-Fi module, etc. The personal electronic device 120 is configured and programmable by the device pairing software application 126 to perform the functions as described herein.

Figure 2:
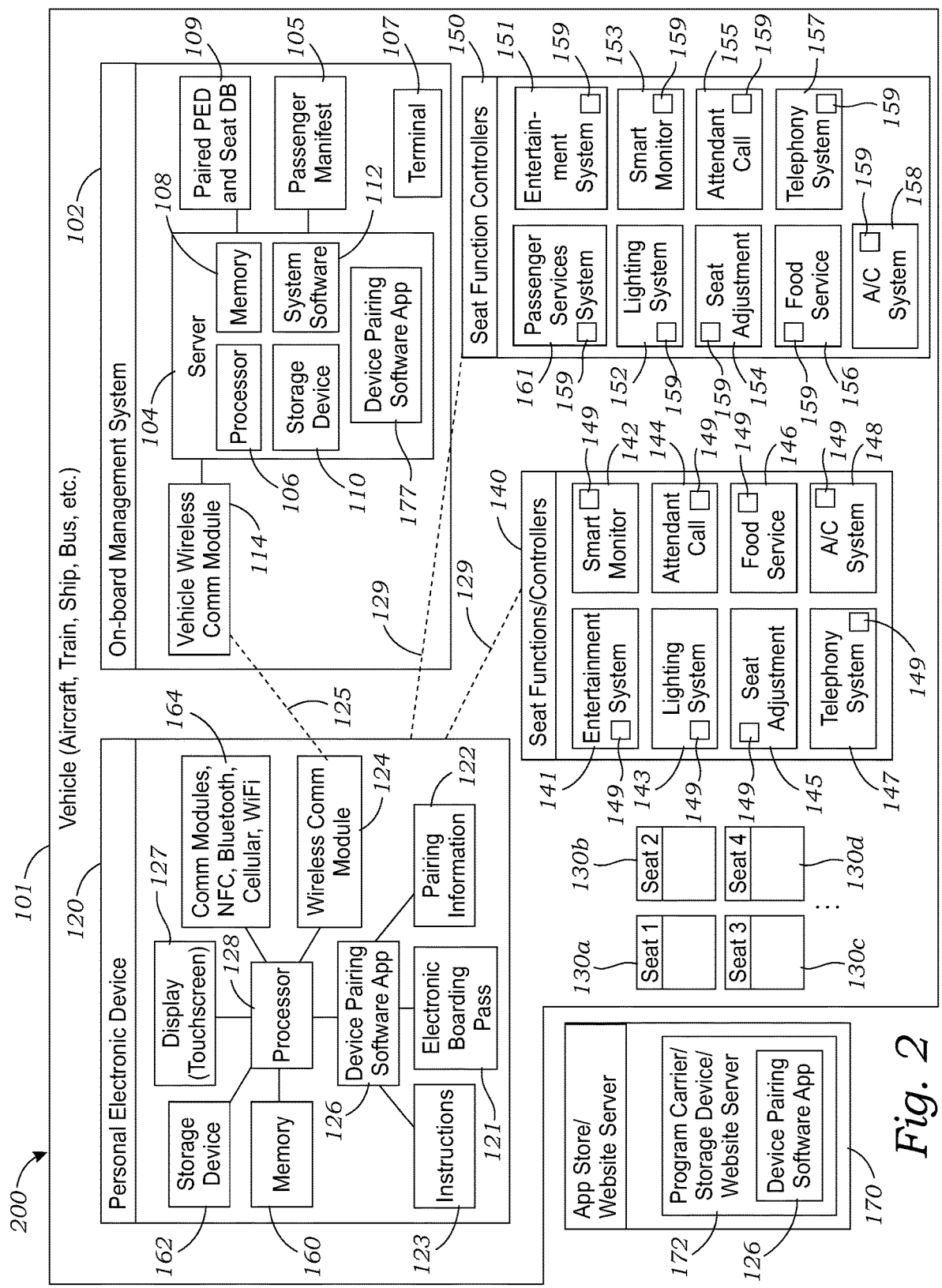
FIG. 2 is a block schematic diagram of a system for pairing a personal electronic device to a particular passenger seat in a vehicle, according to another embodiment of the present invention.

Turning now to FIG. 2, a schematic diagram of another embodiment of a passenger pairing system 200 is shown. In the embodiment of FIG. 2, a passenger manifest 105 accessed and stored by the on-board management system 102 is utilized to pair the personal electronic device 120 to a particular passenger seat 301a on the vehicle 101. The system 200 is similar to the system 100 described above, and includes many of the same components having the same or similar configuration and functionality. Accordingly, the description of the elements of the system 100 having like reference numerals as system 200 is applicable to system 200, unless inapplicable or otherwise described. Accordingly, the on-board management system 102 is configured, at least in part by the software program 112, to receive and store a passenger manifest 105. The passenger manifest 105 includes each passenger identity for a trip on the vehicle 101 associated with the passenger's assigned passenger seat 301 for the trip. The on-board management system 102 may receive the passenger manifest 105 by any suitable manner, such as by an electronic download from the carrier operating the vehicle via a communications network, or data transfer from a storage device (e.g., a flash memory drive, CD, DVD, storage disk, SSD, etc.) or another system on-board the vehicle 101. The on-board management system 102 stores the passenger manifest 106 on the storage device 110.

The on-board management system 102 is further configured, at least partly by the software program 112 programming the system 102, to receive pairing information 122 from the personal electronic device 120 via the wireless communication link 125. The pairing information 122 includes passenger identification data (e.g., the passenger name, identification number, or other data which can be cross-referenced to a passenger identity on the passenger manifest) and a personal electronic device identifier which identifies the particular personal electronic device 120 being paired to the passenger seat 130*a*. This is similar to the system 100, except that instead of a passenger seat identifier, the pairing information includes passenger identification data. The personal electronic device identifier may be as described above with respect to system 100.

The on-board management system 102 is configured to determine the passenger identity on the passenger manifest 105 using the passenger identification data. For instance, the on-board management system 102 may be configured to search and identify a passenger identity that matches or best matches the passenger identification data received in the pairing information 122. The on-board management system 102 also determines the passenger seat 130*a* assigned to the passenger using the passenger manifest 105, as the passenger identity is associated with the passenger seat 103*a* on the passenger manifest 105.

The on-board management system 102 is further configured and programmed to pair the personal electronic device 120 to the passenger seat 130*a* and authorizes the personal electronic device 120 to control one or more passenger seat functions 140 associated with the particular passenger seat 130*a*, as described above for system 100.

The device pairing software application 126 for the system 200 is similar to the application 126 for the system 100, except that it is configured to transmit the pairing information 122 including the passenger identification data, instead of passenger seat identifier. Thus, the device pairing software application 126 is configured to access passenger identification data. The device pairing software application 126 may access passenger identification data by any suitable method, such as the passenger entering passenger personal information data (e.g., passenger name, passenger identifying information such as a user name, identification number), which is itself usable by the on-board management system 102 to match and identify with a passenger identity on the passenger manifest 105, or which the device pairing software application 126 can analyze and/or process to access and/or generate the passenger identification data. For instance, the passenger may enter a name, and/or other personal information into the device pairing software application 126 and register a username and password. Then, when the passenger desires to pair the personal electronic device 120, the application 126 requests the passenger to log-on with the username and password. Then, when the username and password are authenticated by the device pairing software application 126, the application 126 accesses the passenger identification data and transmits the pairing information to the on-board management system 102. Alternatively, the device pairing software application 126 can be configured the same as or similar to as described for system 100. The application 126 obtains an electronic boarding pass 121, as described above, and then accesses passenger identification data (e.g., passenger name, etc.) from the electronic boarding pass 121.

The other features of system 200 are the same as described above for system 100, including without limitation the personal electronic device 120, seat functions 140, seat function controllers 150, and their configuration and operation for controlling the seat functions 140.

Figure 3:
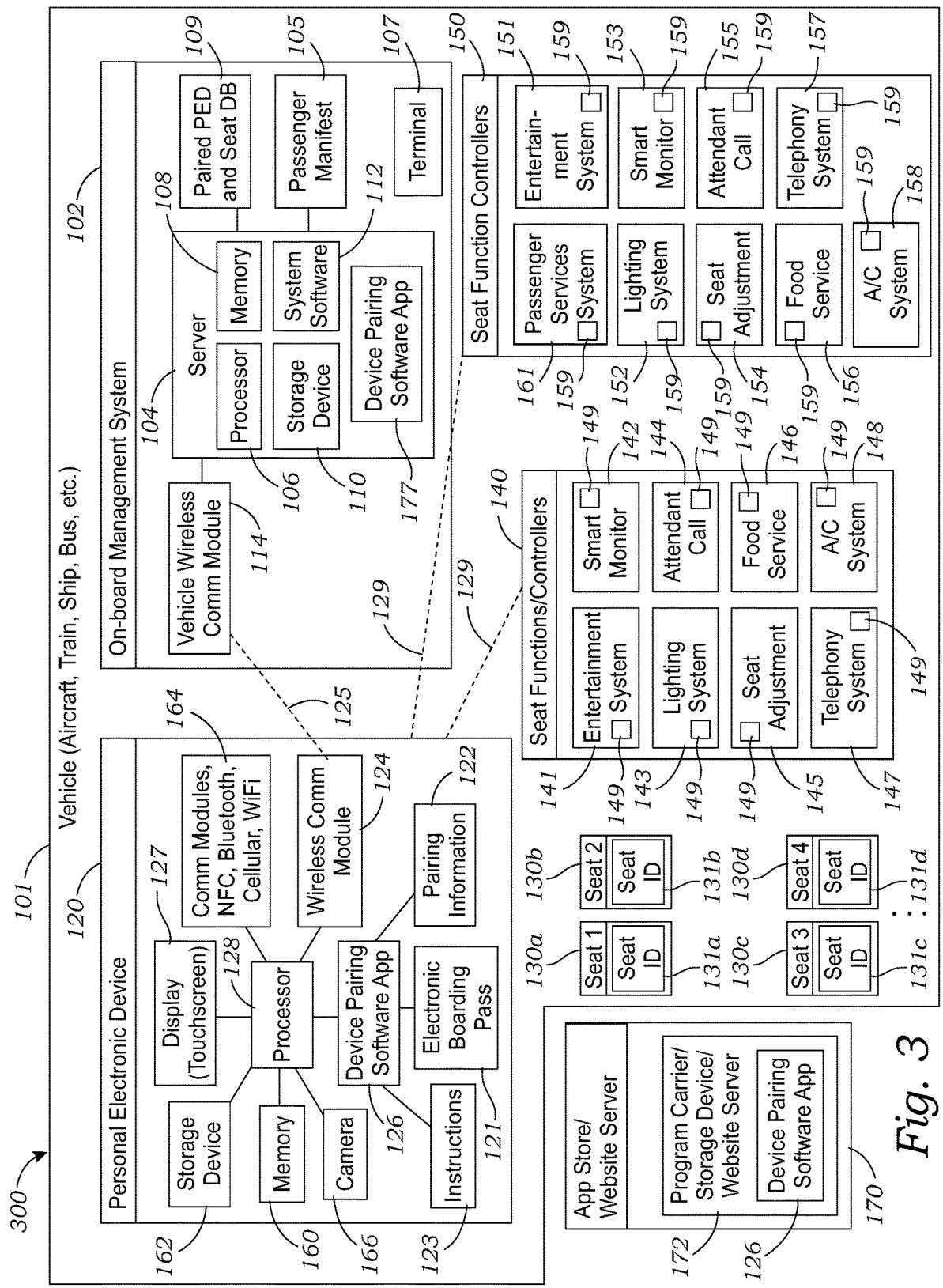
FIG. 3 is a block schematic diagram of a system for pairing a personal electronic device to a particular passenger seat in a vehicle, according to still another embodiment of the present invention.

Referring now to FIG. 3, a schematic diagram of still another embodiment of a passenger pairing system 300 is shown. In the embodiment of FIG. 3, a seat identification device 131 is utilized to pair the personal electronic device 120 to a particular passenger seat 130 for the passenger. Again, system 300 is similar to systems 100 and 200 described above, and includes many of the same components having the same or similar configuration and functionality. Accordingly, the description of the elements of systems 100 and 200 having like reference numerals as system 300 is applicable to system 300, unless inapplicable or otherwise described.

In system 300, a seat identification device 131*a*, 131*b*, 131*c*, and 131*d* is configured to be located proximate each passenger seat 130*a*, 130*b*, 130*c*, and 130*d*, respectively. The seat identification device 131 is configured to communicate a passenger seat identification which identifies the particular passenger seat proximate the respective seat identification device 131. For example, the seat identification device may be an NFC terminal, a radio frequency identification tag ("RFID" tag), a Bluetooth module, an optically readable code, or other suitable device detectable by the personal electronic device 120. Preferably, the passenger seat identification communicated by a particular passenger seat identification device 131 can be singularly detected by the personal electronic device 120 without detecting other identifications from other passenger seat identification devices 131. This may be accomplished by configuring the passenger seat identification device 131 to only transmit the seat identification within a very small vicinity such that the personal electronic device 120 must be placed very close to the device 131 in order to receive the passenger seat identification, or to only transmit the seat identification when receiving an input to do so (e.g., a tap from the personal electronic device 120 or a push button).

In system 300, the on-board management system 102 is configured, at least in part by the software program 112, to receive pairing information 122 from the personal electronic device 120 via the wireless communication link 125. The pairing information 122 includes a passenger seat identifier which is based upon the passenger seat identification obtained from the seat identification device 131 and a personal electronic device identifier which identifies the particular personal electronic device 120 being paired to the passenger seat 130*a*. This is similar to the system 100, except that passenger seat identifier is based upon the passenger seat identification obtained from the seat identification device instead of an electronic boarding pass 121. The personal electronic device identifier may as described above with respect to system 100.

The on-board management system 102 is further configured and programmed to pair the personal electronic device 120 to the passenger seat 130*a* using the pairing information 123 and authorizes the personal electronic device 120 to control one or more passenger seat functions 140 associated with the particular passenger seat 130*a*, as described above for system 100.

The device pairing software application 126 for the system 300 is similar to the application 126 for the system 100, except that it is also configured to detect the passenger seat identification from the seat identification device 131, and then transmit the passenger seat identifier based on the passenger seat identification from the seat identification device 131 to the on-board management system 102 via the wireless communication link 125. Thus, the device pairing software application 126 is configured to program the personal electronic device 120 to detect the passenger seat identification from the seat identification device 131. In the case that the seat identification device 131 transmits a radio signal, the personal electronic device 120 and application 126 are configured to receive the radio signal and obtain the passenger seat identification. For an optically readable seat identification device 131, the personal electronic device 120 has a camera or other optical sensor for detecting the device 131 and obtaining the passenger seat identification. For instance, for a QR code or bar code, the personal electronic device and/or application 126 includes a code reader program for reading the code. The device pairing software application 126 then processes the passenger seat identification into a passenger seat identifier (which may be the same or different than the passenger seat identification) which is transmitted to the on-board management system 102.

The system 300 may also be configured to authenticate the pairing of the personal electronic device 120 to the passenger seat 130*a*, such as by using the passenger manifest 109 and/or the electronic boarding pass 121 to verify the pairing. The device pairing software application 126 is further configured to access passenger seat data identifying an assigned passenger seat assigned to the passenger. For example, the device pairing software application may obtain the assigned passenger seat from an electronic boarding pass received by the personal electronic device 120, as described above for system 100. The device pairing software application 126 transmits an assigned passenger seat identifier identifying the assigned passenger seat to the on-board management system 102 via the wireless communication link 125. The on-board management system is further configured to receive the assigned passenger seat identifier and determine whether the assigned passenger seat matches the passenger seat associated with the passenger seat identifier. Then, the on-board management system 102 is configured to only pair the personal electronic device 120 to the passenger seat and/or to only authorize the personal electronic device to control the seat functions 140 associated with the passenger seat if the passenger seat matches the assigned passenger seat.

Another way of authenticating the pairing uses the passenger manifest 105. The device pairing software application 126 is further configured to access passenger identification data as described above for system 200. The device pairing software application 126 transmits the passenger identification data to the on-board management system via the wireless communication link. The on-board management system 102 is further configured to receive and store passenger manifest data including each passenger identity associated with a respective assigned passenger seat for each passenger, as described above for system 200. The on-board management system 102 receives the passenger identification data and determines the passenger identity on the passenger manifest using the passenger identification data, as also described above for system 200. The on-board management system then determines whether the assigned passenger seat matches the passenger seat associated with the passenger seat identifier. The on-board management system 102 is configured to only pair the personal electronic device 120 to the passenger seat and/or to only authorize the personal electronic device to control the seat functions 140 associated with the passenger seat if the passenger seat matches the assigned passenger seat.

The other features of system 300 are the same as described above for systems 100 and 200, including without limitation the personal electronic device 120, seat functions 140, seat function controllers 150, and their configuration and operation for controlling the seat functions 140.

Figure 8:
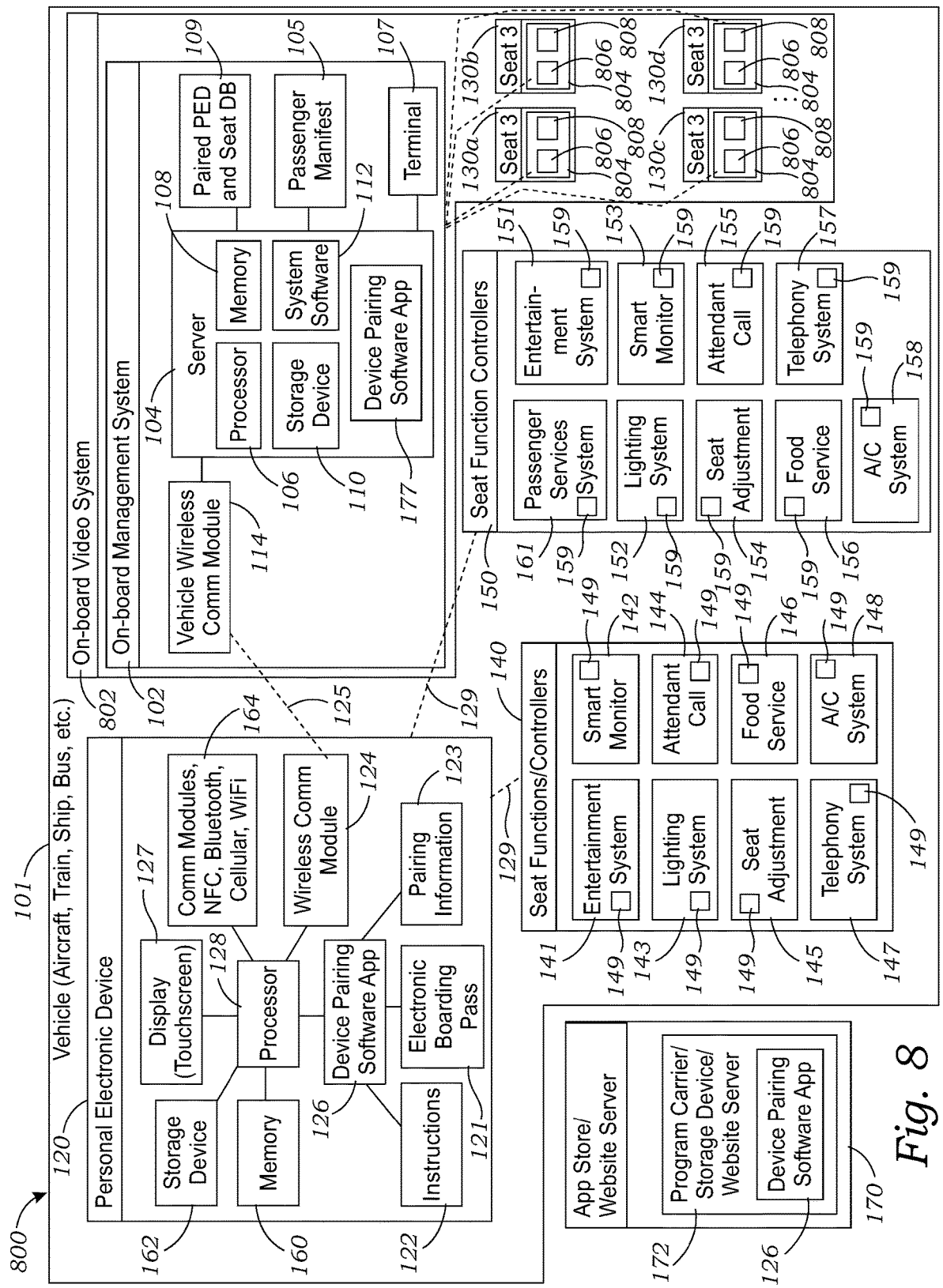
FIG. 8 is a block schematic diagram of a system for pairing a personal electronic device to a particular passenger seat in a vehicle utilizing light identification communication, according to another embodiment of the present invention.

Referring now to FIG. 8, a schematic diagram of another embodiment of a passenger pairing system 800 is shown. The passenger seat pairing system 800 shown in FIG. 8 utilizes light identification communication to pair the passenger's personal electronic device 120 to a particular passenger seat 130 for the passenger. Again, system 800 is similar to systems 100, 200 and 300 described above, and includes many of the same components having the same or similar configuration and functionality. Accordingly, the description of the elements of systems 100, 200 and 300 having like reference numerals as system 800 is applicable to system 800, unless incompatible or otherwise described.

The system 800 has an on-board video system 802 which includes an on-board management system 102, which is similar to the on-board management system 102 of system 100, 200, and 300, except it is further configured and programmed as described below. The on-board video system 802 also includes an in-seat display system 804 which is in operable communication with the on-board management system 102. An in-seat display system 804 may be installed at each seat 130 of the vehicle 101, as shown in FIG. 8. As an example, the on-board display system 802 may be an IFE, or other on-board entertainment system for providing video and audio entertainment to the passengers at each passenger seat 130.

Each in-seat display system 804 includes a computing device 806 and a monitor 808 such as an LCD, LED, OLED, or other display and an audio output interface for outputting audio such as to a headphone jack, operably coupled to the computing device. For example, the in-seat display system 804 may be a smart monitor having a computing device 806 and a monitor 808.

The on-board management system 102 and in-seat display system 804 are in operable communication with each other, such as via a communication network (e.g., an Ethernet network, Wi-Fi network, wireless USB network, etc.) or data bus communication. In the embodiment shown in FIG. 8, the on-board management system 102 may be a central management system in network communication with each of the in-seat display systems 804 installed at each seat 130. Alternatively, the on-board management system 102 and in-seat display system 804 may be integrated together. For example, a smart monitor may comprise, and perform all of the functionality of, the on-board management system 102 and in-seat display system. In still another alternative embodiment, the on-board video system 802 may comprise an on-board management system 102 installed at each seat and operably coupled to a respective in-seat display system 804.

The on-board video system 802 is configured to pair the passenger's personal electronic device 120 to the passenger's seat on the vehicle using light identification communication, and allow the personal electronic device 120 to control at least one seat function for the seat. The on-board video system 802, including the on-board management system 102 and in-seat display system, is configured to display on the monitor 808 a light identification (e.g., a pulse width modulation pattern of flashing light) associated with the particular seat 130 which is being paired with the personal electronic device 120. The light identification is a pulse width modulation communication produced by modulating a backlight of the monitor 808. The light identification can be captured by an imaging device 166 of the personal electronic device 120. As described above, systems and methods for displaying a pulse width modulation communication by modulating a light, such as a backlight of a monitor, is described in U.S. Pat. No. 9,166,810, filed on May 24, 2013.

In one embodiment, the on-board video system 802 assigns a seat code associated with the seat 130. The on-board video system 802 converts the seat code to a binary code corresponding to a seat code associated with the seat and then converts the binary code into a pulse width modulated flashing pattern of the backlight of the monitor 808, typically in a frequency range from 1 kHz-20 kHz. This light identification transmission of a pairing code has significant advantages over alternative means of transmitting a seat identification code. The light identification communication has a faster response time compared to many radio frequency communications, such as Bluetooth communication, and other optical code reading methods, such as QR codes, bar codes, and the like. The light identification communication generally does not require any linking, pairing, or signing in with username and/or password, such as required by Bluetooth, Wi-Fi, and the like.

The personal electronic device 120 is similar to the personal electronic device 120 as described above, except that the device pairing software application 126 also programs the personal electronic device 120 for light identification pairing. The personal electronic device 120 is configured, at least partly by the device pairing software application 126, to receive the light identification displayed on the monitor 808 using the camera 166 (or other imaging device) of the personal electronic device 120. The camera 166 captures one or more images of the light identification as it is displayed on the monitor 808. The personal electronic device 120 processes the image(s) of the light identification, including decoding the light identification. For example, the device pairing software application 126 may decode the images of the light identification and determine the binary code that the on-board video system 802 used to generate the light identification. The personal electronic device 120 generates a light identification code corresponding to the light identification (e.g., corresponding to the decoded binary code). The personal electronic device 120 then sends pairing information, including the light identification code corresponding to the light identification and a personal electronic device identifier identifying the personal electronic device 120 to the on-board video system 802 via the wireless communication link 125.

The on-board video system 802 receives the pairing information from the personal electronic device 120 via the wireless communication link 125. The on-board video system 802 then processes the pairing information, including determining whether the light identification code received from the personal electronic device is valid and also identifying the seat associated with the light identification code. The on-board video system 802 determines whether the light identification code corresponds to the light identification displayed on the monitor. In the case that the light identification code sent by the personal electronic device 120 is a binary code from decoding the light identification, the validity can be determined by simply checking whether the light identification code matches the original binary code. If the light identification code is some other code generated from processing the image(s) of the light identification, then the on-board video system 802 decodes light identification code and determines if it matches the seat code used to generate the light identification. The on-board video system 802 identifies the seat 130 associated with the light identification code by finding the determining which seat is associated with the decoded light identification code.

When the on-board video system 802 determines that the light identification code received from the personal electronic device is valid, then the on-board video system pairs the personal electronic device to the seat and authorize the personal electronic device to control at least one passenger seat function associated with the seat, as described above.

Once the personal electronic device 120 paired and authorized for the seat 130, the on-board video system 802 allows the personal electronic device 120 to control seat functions 140. The personal electronic device 120, using the device pairing software application 126, sends control instructions to the on-board video system 802 via the wireless communication link, and the on-board video system 802 receives the control instructions and controls one or more seat functions upon on the control instructions. As described above, the passenger seat pairing system 800 may include one or more seat function controllers 150 configured to control the seat functions 140, The system 800 may also be configured to authenticate/validate the pairing of the personal electronic device 120 to the passenger seat 130, using the electronic boarding pass 121, as described above. Then, the on-board video system 802 management system 102 is configured to only pair the personal electronic device 120 to the passenger seat 130 and/or to only authorize the personal electronic device to control the seat functions 140 associated with the passenger seat 130 if the passenger seat 130 matches the assigned passenger seat.

The system 800 may also be configured to authenticate/validate the pairing using the passenger manifest 105 to validate the pairing, similar to the passenger manifest validation described above with respect to system 300. The pairing information sent by the personal electronic device 120 also includes passenger identification data, such as the passenger name (which may be encrypted or converted into a code), stored by the device pairing software application 126. Thus, the on-board video system 802 also receives the passenger identification data from the personal electronic device 120 via the wireless communication link 125. The on-board video system 802 stores passenger manifest data 105 including each passenger identity associated with each passenger's assigned passenger seat. The on-board video system 802 then attempts to validate the passenger's personal electronic device 120 for pairing to the seat 130 before pairing and authorizing the personal electronic device. The on-board video system 802 uses the passenger manifest 105 to determine whether the passenger identification data and the seat associated with the light identification correspond to a passenger identity and associated assigned passenger seat on the passenger manifest 105. The on-board video system 802 is configured to only pair the personal electronic device 120 and authorize the personal electronic device 120 to control seat functions 140 when the passenger identification data and the seat associated with the light identification correspond to a passenger identity and associated assigned passenger, i.e., the pairing of the personal electronic device to the particular seat is validated by the passenger manifest. If they do not correspond, the pairing is denied.

The on-board video system 802 may also have a security feature to prevent more than one personal electronic device from pairing to a particular seat. The on-board video system 802 is configured to prevent or block any other personal electronic devices from using the light identification to pair to the particular seat after receiving from a first personal electronic device 120 a light identification code corresponding to the light identification displayed on the monitor 808. This prevents someone else (e.g., an adjacent passenger, or someone looking over a passenger's shoulder) from pointing the camera of their personal electronic device at the monitor 808 and attempting to use the same light identification to pair to the particular seat. Further, each light identification is unique and may be used only once. Unique light identifications may be generated by known techniques, such as by employing timestamps, in combination with other information, such as a seat number, IP address, or MAC number of a computing device, by way of illustrative, non-limiting example.

Figure 9:
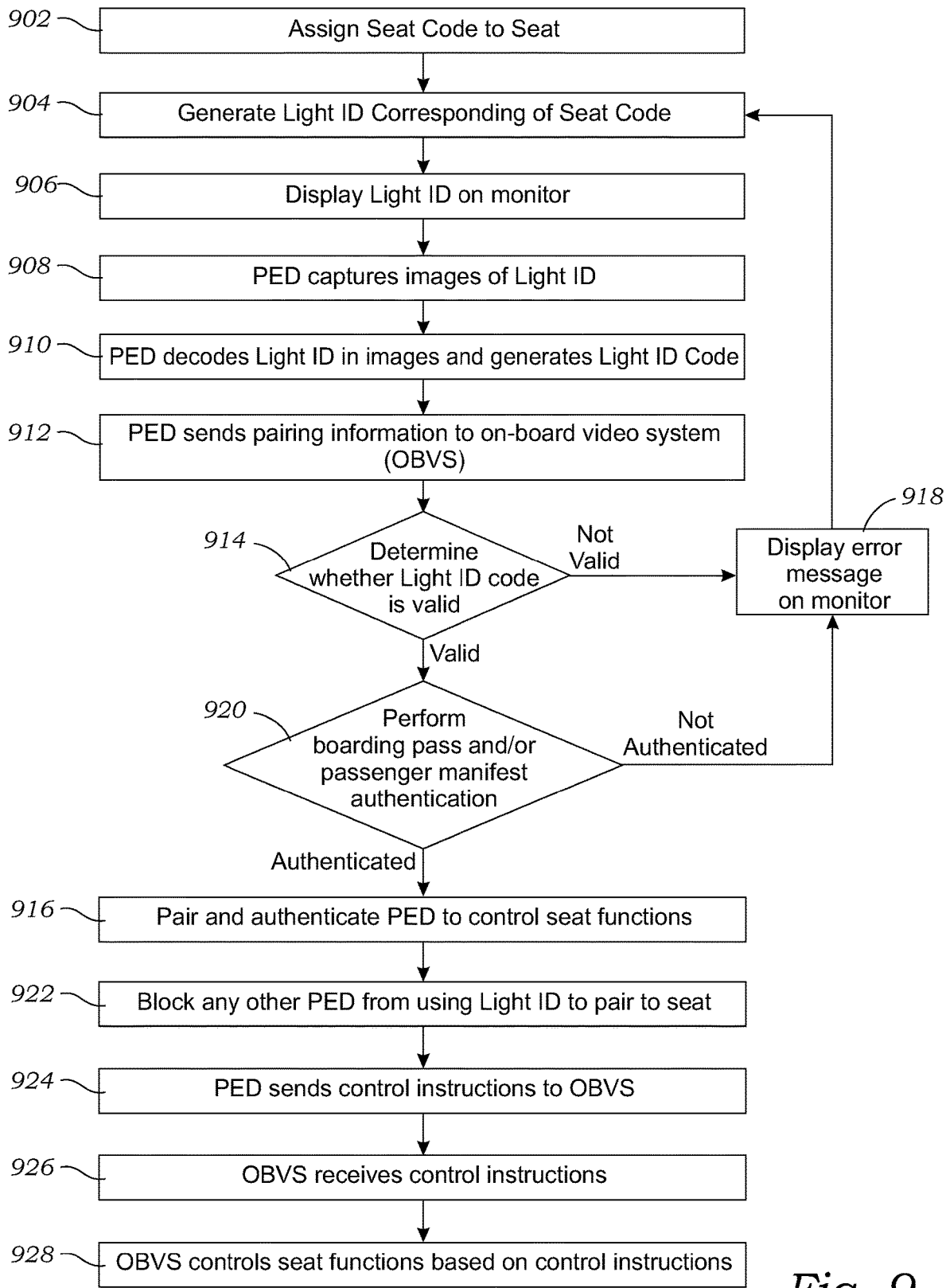
FIG. 9 illustrates an exemplary flow chart for a method for pairing a personal electronic device to a particular passenger seat in a vehicle using light identification communication.

Turning to FIG. 9, a method 900 for using the system 800 for pairing a personal electronic device 120 to a passenger's seat 130, and authorizing the personal electronic device 120 to control seat functions 140 for the passenger's seat 130 will now be described. It is understood that the methods 400 and 500 for the operation of the personal electronic device 120 and the on-board management system 102, described above, may be performed within the method 900.

At step 902, the in-seat video system 802 assigns a seat code corresponding to a particular passenger seat 130. At step 904, the on-board video system 802 generates a light identification pattern (e.g., a binary code) corresponding to the seat code. At step 906, the on-board video system displays the light identification on the monitor 808 of the in-seat display system 804. At step 908, the personal electronic device 120 captures image(s) of the light identification using the camera 166. At step 910, the personal electronic device 120 decodes the light identification captured in the image(s) and generates a light identification code using the decoded light identification. At step 912, the personal electronic device 120 sends pairing information, including the light identification code and personal electronic device identifier to the on-board video system 802 via the wireless communication link 125.

At step 914, the on-board video system 802 receives the pairing information sent from the personal electronic device 120 via the wireless communication link 125. At step 916, the on-board video system 802 determines whether the light identification code is valid. If the light identification code is valid, then, at step 918, the on-board video system 802 pairs the personal electronic device 120 to the seat 130 and authorizes the personal electronic device 120 to control seat control functions 140 for the seat 130. If the light identification code is not valid, the on-board video system 802 may display an error message on the monitor 808. At step 920, the method 900 may optionally utilize the boarding pass and/or passenger manifest authentication/validation processes prior to step 918.

At step 922, the on-board video system blocks any other personal electronic device 120 from using the light identification displayed on the monitor 808 to attempt to pair to the seat 130.

At step 924, the personal electronic device 120 sends control instructions to control seat functions 140 for the seat 130 to the on-board video system 802 via the wireless communication ink 125. At step 926, the on-board video system 802 receives the control instructions from the personal electronic device 120 via the wireless communication ink 125. At step 928, the on-board video system 802 controls the seat functions 140 based upon the control instructions received from the personal electronic device 120.

In another aspect, any of the systems 100, 200 and/or 300, may be configured to account for a passenger switching seats from his/her assigned passenger seat as set forth on a boarding pass or in the passenger manifest, or for incorrect seat assignments. In one embodiment, the on-board management system 102 further comprises a cabin crew terminal 107 and cabin software application (which may be integrated with the software program 112 or a separate application) which displays a cabin crew user interface for viewing registered (e.g., paired) personal electronic devices 120 and optionally paired passenger seats. The cabin software application is configured to allow an authorized crew member to select a registered personal electronic device and pair and authorize the personal electronic device to a particular passenger seat. The cabin software application may also be configured to allow an authorized crew member to override the authentication described above so that a personal electronic device of a passenger can be paired and authorized for a passenger seat other than the passenger's assigned passenger seat.

Figure 4:
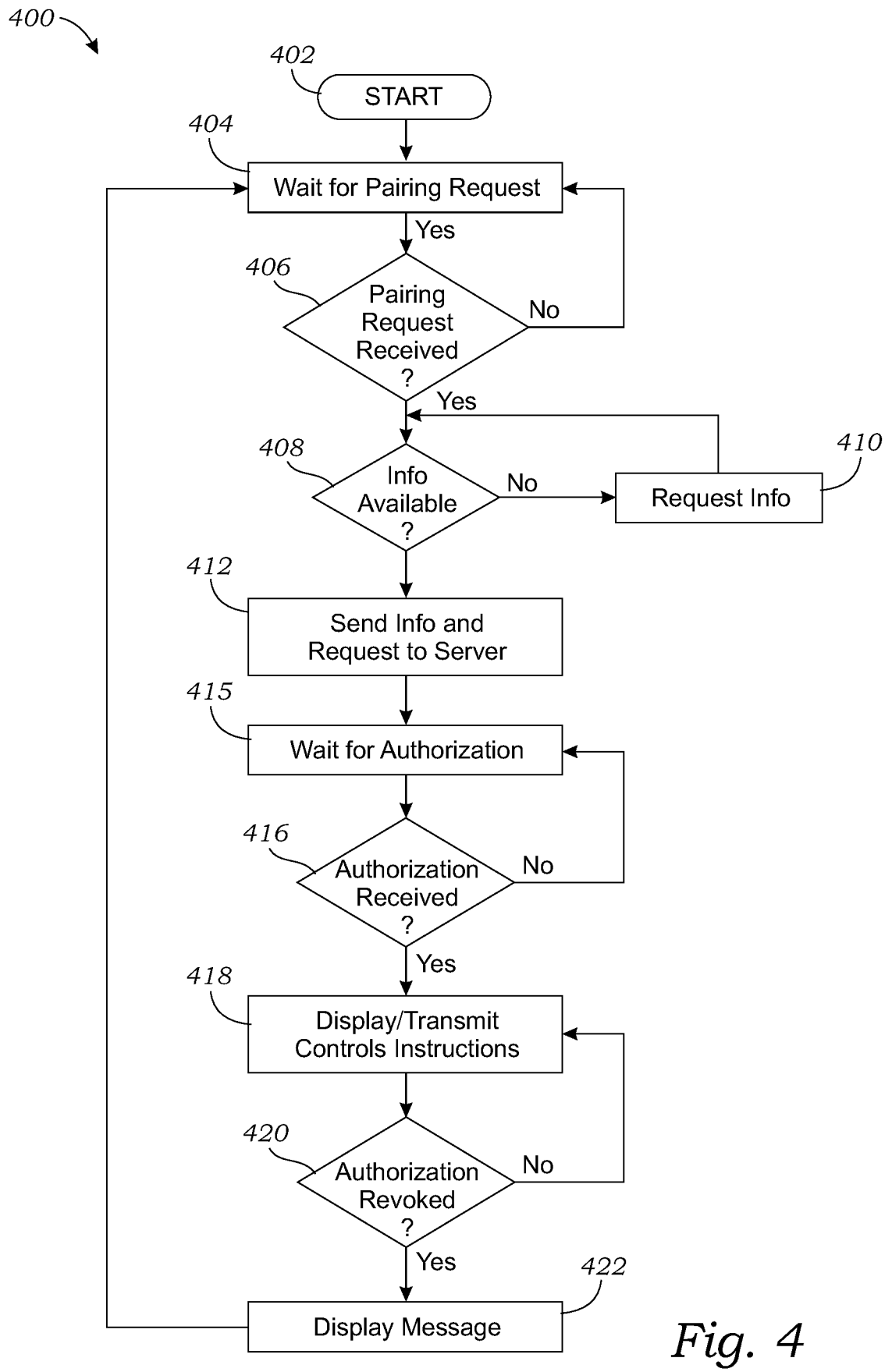
FIG. 4 illustrates an exemplary flow chart for a device pair pairing software application of a personal electronic device.

FIG. 4 illustrates an exemplary flow chart for a method 400 for the operation of the device pair pairing software application 126 of the personal electronic device 120. After the application 126 is launched or started as indicated by start symbol 402, the application waits for a pairing request in block 404. If no pairing request is received as indicated in decision symbol 406, the application continues to wait for input of a request. The waiting process as described herein may be a polling process, whereupon the logic checks at a predefined interval for receipt of a pairing request or it may be event driven.

If a pairing request is received, the processing logic thereafter inquires if the necessary information is available and valid as indicated in decision symbol 408. Preferably, an electronic ticket has been communicated to the personal electronic device 120, from which the software application 126 has extracted the necessary information, e.g., seat number, flight or route number, confirmation number and identifying passenger information.

If necessary information is not available or is invalid, the software application 126 requests the information from the passenger in block 410. The passenger may use a camera on the personal electronic device 120 to read a barcode or a quick response (QR) code on a printed ticket to provide missing information. Alternatively, the user may input the information into input fields presented by the software application 126, either manually or using voice input. As yet another alternative, the passenger may bring the personal electronic device 120 within range of a NFC terminal at a seat to supply the seat number for the software application 126. Instead of a NFC terminal, the seat information may be communicated to the personal electronic device via Bluetooth communication, an RFID tag, or an Apple iBeacon™ at the passenger's seat. After input of the information in block 410, the logic once again determines if the necessary information is available and valid as indicated in decision symbol 408. If so, the logic sends the necessary information to the server 104 of the on-board management system 102 as indicated in processing block 412.

Thereafter, the logic waits for receipt of authorization approval in block 415 from the server 104. If approval is received as indicated in decision symbol 416, the software application 126 displays controls for interacting with seat function controllers 140 or 150 and transmitting commands thereto as indicated in block 418. The control commands may be transmitted directly from the personal electronic device 120 to the seat function controllers 140 or 150, or first be transmitted to the on-board management system 102, which in turn sends the appropriate command to the seat function controllers 140 or 150. Alternatively, displaying controls and transmitting commands may be performed by another software application after authorization for pairing has been received.

The software application 126 continues to check if authorization has been revoked as indicated by decision symbol 420. On some flights, passengers may wish to switch to another seat, and a vehicle crew member may cause the server 104 to revoke a previous authorization. Checking for revocation may be in the form of monitoring for a revocation message from the server 104 or an application running on the seat function controllers 140 or 150. If authorization is revoked, the software application 126 displays a message as indicated in block 422 to inform the passenger. Thereafter, the logic returns to wait for another pairing request in block 404. If authorization has not been revoked, the software application 126 continues to display controls and transmit commands as entered by the passenger. Authorization is normally revoked when the trip or flight is complete and the seat is made available for another passenger. As described herein with respect to FIGS. 4 through 6, waiting or monitoring may be performed by polling at a predefined interval or as an event driven process.

Figure 5:
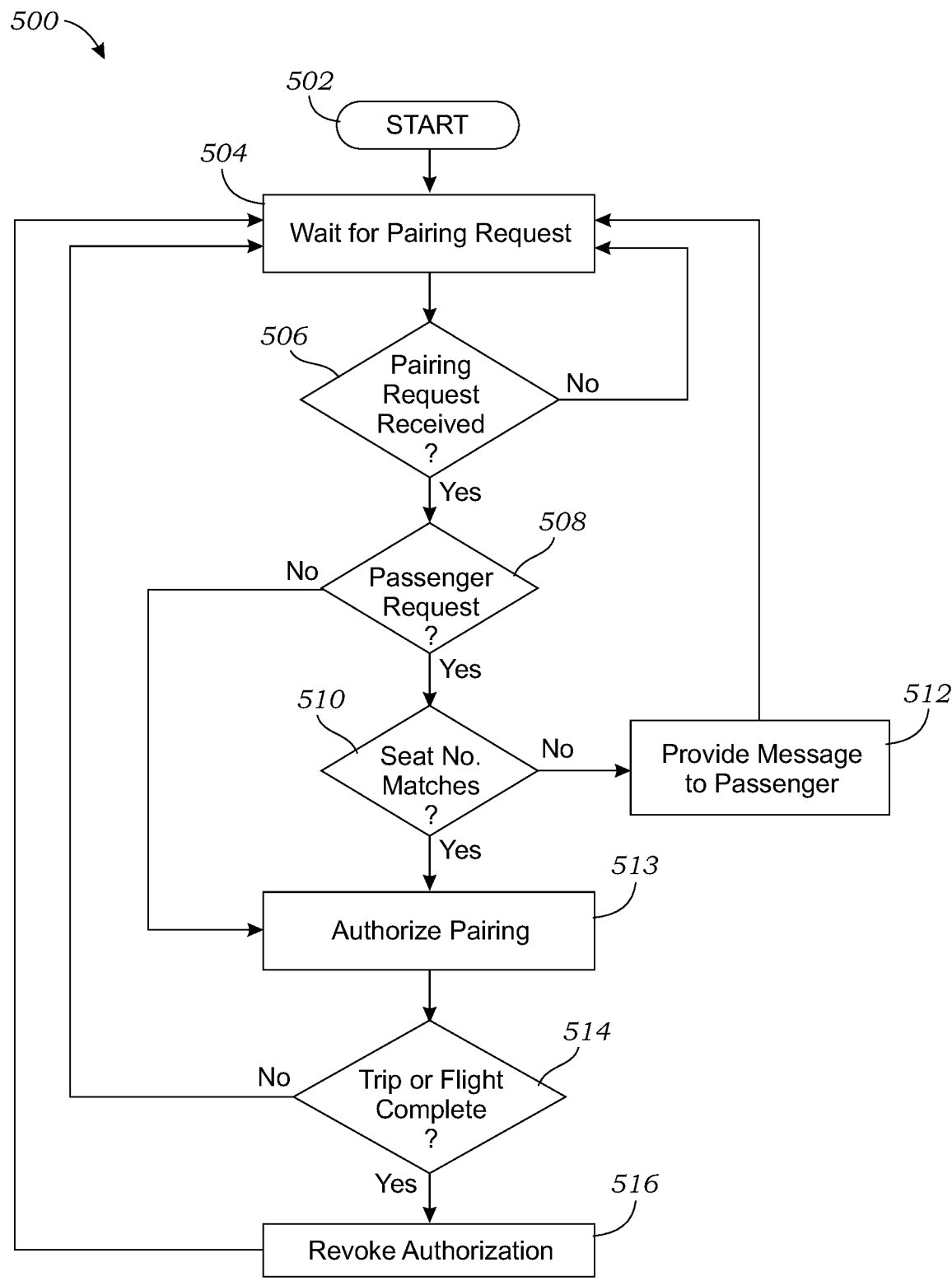
FIG. 5 illustrates an exemplary flow chart for a device pair pairing software application of a server.
Figure 7:
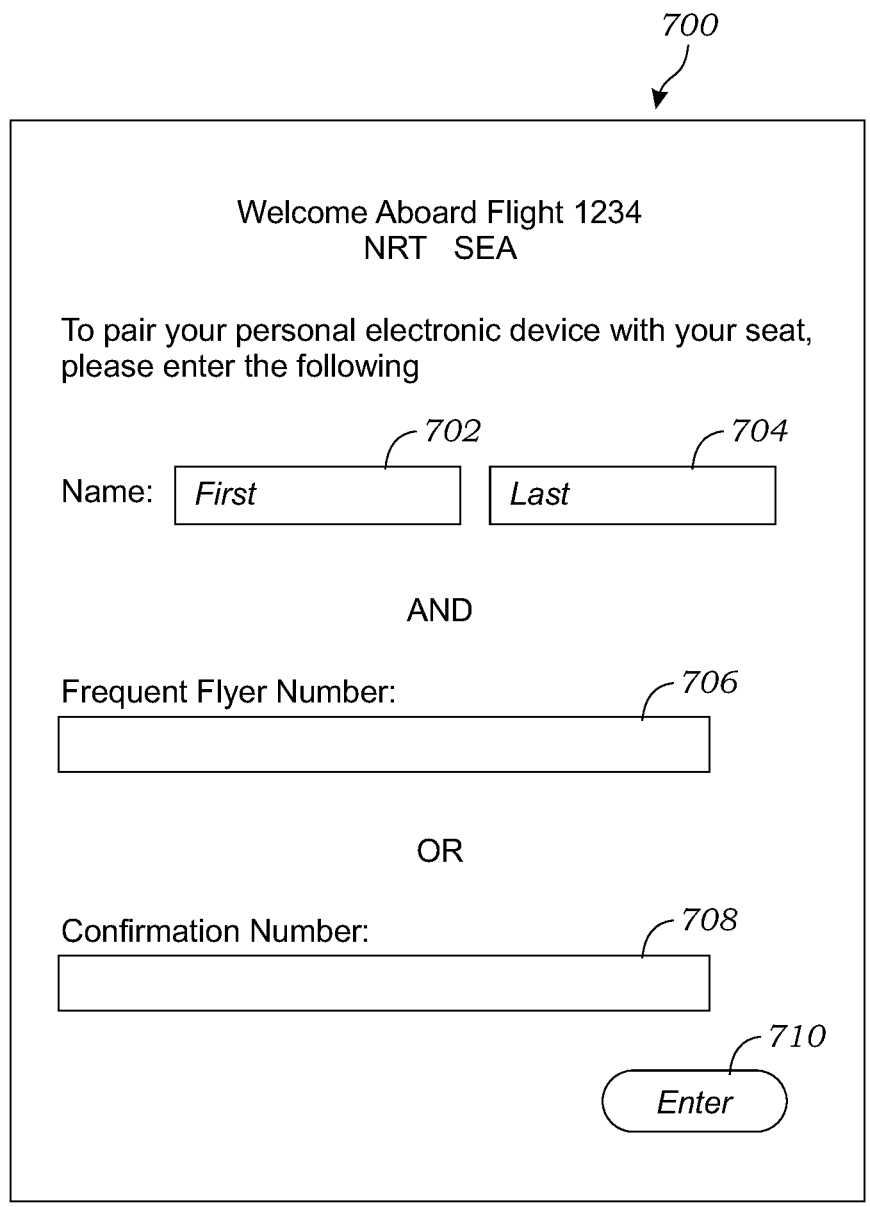
FIG. 7 illustrates an exemplary webpage for viewing by a personal electronic device for use with a vehicle that is an aircraft.

FIG. 5 illustrates an exemplary flow chart for a method 500 for the operation of the device pairing software application 177 of the server 104. After the application 126 is launched or started as indicated by start symbol 502, the application waits for a pairing request in block 504. The pairing request may come from the device pairing software application 126 installed on a personal electronic device 120. Alternatively, the pairing request may be submitted via a webpage 700 as shown in FIG. 7.

In particular, the on-board management system 102 preferably hosts a webpage 700 for passengers that do not have the device pairing software application 126 installed on their personal electronic device. FIG. 7 illustrates an exemplary webpage 700 for the particular case of a vehicle that is an aircraft. Passengers may access the webpage 700 using a browser on their personal electronic device 120 to enter passenger identification. As the webpage 700 is hosted by the on-board management system 102, the on-board management system has access to data indicating the flight number, departure, destination and other information may display some of this information on the webpage 700. The passenger enters their identification information into the data entry fields 702, 704, 706 and/or 708 of the webpage 700 and submits the data via the enter/submit field 710 or by pressing return or enter on a keyboard. The logic of FIG. 5 operated by the on-board management systems accepts the submitted data as passenger identification information and a pairing request.

Minimal information is requested by the webpage 700 to identify the passenger such as name, and one other identifying piece of information, such as confirmation frequent flyer or loyalty number, to reduce the data input burden on the passenger. In other embodiments, more or less identification information may be required from the passenger. The webpage 700 is preferably hosted by the server 104 as a site optimized for mobile devices to make it as easy as possible for viewing the webpage on small screens, such as on mobile phones. The webpage 700 may automatically comes up as a portal page when a passenger first connects to a vehicle wireless communication module 114, e.g., a WAP, with their personal electronic device 120, or require the passenger to input a web address.

Returning to FIG. 5, if no pairing request is received, the device pairing application 127 of the server 104 continues to wait for input of a request as indicated in decision symbol 506. If a pairing request has been received, the logic next inquires if the request is from a passenger, as opposed to from a vehicle crew member, as indicated by decision symbol 508. If the pairing request is from a passenger, the logic thereafter inquires if the number for the seat of the request pairing matches with the information for that passenger as indicated by decision symbol 510. If information available to the sever 104 indicates that the requested seat is assigned to another passenger for that trip or flight, the logic communicates a message to the passenger as indicated in block 512. Thereafter, the logic returns to wait for another pairing request in block 504.

If the seat is assigned to that passenger, i.e., the information matches, the software application 126 of the server 104 authorizes the pairing in block 513. This is also the situation if the pairing request is submitted by a crew member. As discussed earlier, passengers may wish to switch seats. A vehicle crew member may accommodate this by entering a pairing request to override information in the server 104 that a different passenger has been assigned to that seat. The crew member may enter the request through a crew panel in communication with the server 104 or through a mobile device available only to vehicle crew members in communication with the server 104. Alternatively, the mobile device may be a personal electronic device 120 operated by a crew member, but having a software application installed that is only available to crew members.

The server software application 126 monitors for when the trip or flight is complete as indicated in decision block 514. If the flight is completed, authorization for the pair is revoked in block 516. As discussed earlier, authorization is normally revoked when the trip or flight is complete and the seat is made available for another passenger. Otherwise the server software application 126 continues to monitor for trip or flight completion and another pairing request. Revocation of authorization upon trip or flight completion may alternatively be implemented as a manual command entered by a flight crew member.

Figure 6:
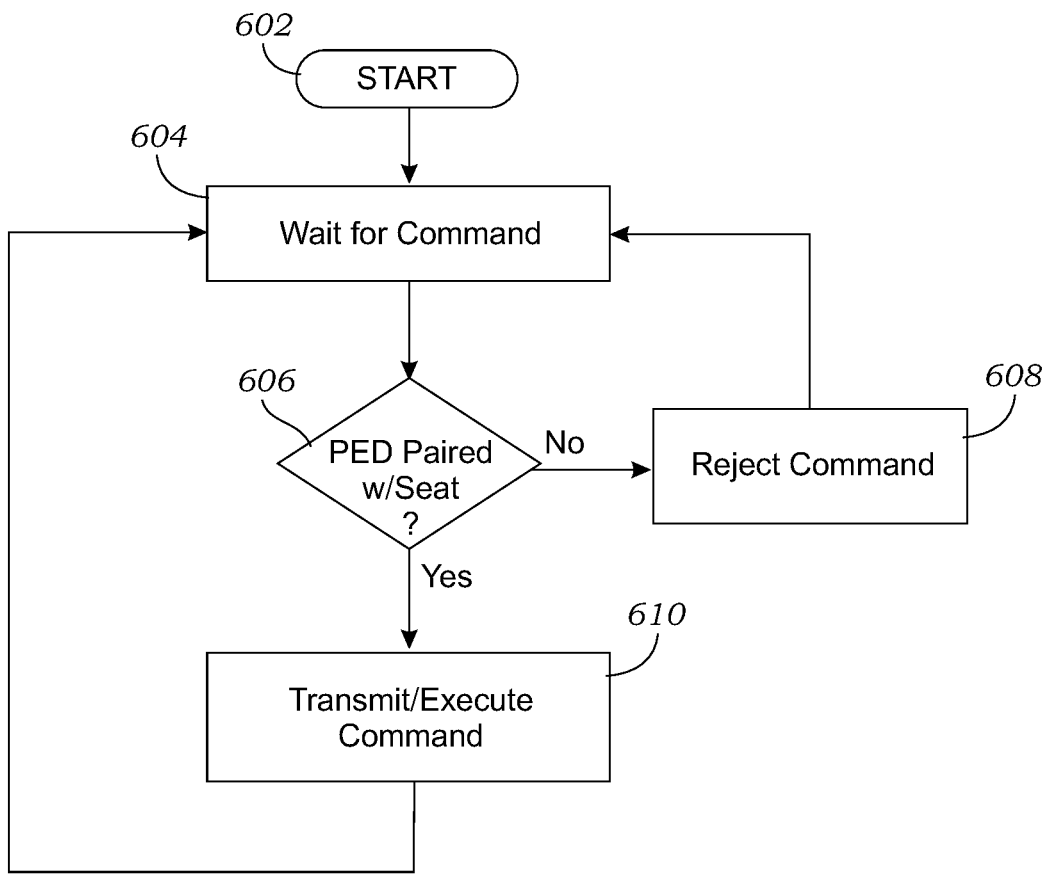
FIG. 6 illustrates an exemplary flow chart for issuing commands to a seat function controller.

FIG. 6 illustrates an exemplary flow chart for issuing commands to the seat function controllers 140 or 150. The flow chart is for logic that may be executed by the server 104, the seat function controllers 140 and 150, or both. After the software application is launched or started as indicated by start symbol 602, the logic waits for a command in block 604 from a personal electronic device 120. The command may be received directly from the personal electronic device 120 or be received indirectly through the server 104.

Thereafter the logic determines if the command came from a personal electronic device paired with that seat in decision block 606. For example, the logic accesses the database 109 of the server 104 to determine which seat the personal electronic device 120 is paired with. If the personal electronic device 120 that originated the command is not paired with that seat, the command is rejected in block 608. This may include notifying the personal electronic device 120 that the command has been rejected.

If the personal electronic device 120 is paired with that seat, the command is transmitted or executed as indicated in block 610. For example, the logic may be executed on a smart monitor 149 or 159, in which the smart monitor may directly execute the command, such as pausing video playback if the command was for pausing video playback. Alternatively, the logic may be executed by the server 104, which transmits the appropriate command, such as to a seat function controller 140 or 150, for example, for seat adjustment. As yet another alternative, the command may be transmitted directly to a seat function control 140 or 150 from the personal electronic device 120, if the logic of FIG. 6 is being executed thereon.

Although particular embodiments have been shown and described, it is to be understood that the above description is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims. For example, not all of the components described in the embodiments are necessary, and the invention may include any suitable combinations of the described components, and the general shapes and relative sizes of the components of the invention may be modified. Accordingly, embodiments are intended to exemplify alternatives, modifications, and equivalents that may fall within the scope of the claims. The invention, therefore, should not be limited, except to the following claims, and their equivalents.

What is claimed is:

1. A system for pairing a personal electronic device (PED) of a passenger with a seat in a vehicle and controlling a seat function for the seat, the system comprising:
   an on-board video system configured to be installed in a vehicle, the on-board video system comprising an on-board management system and an in-seat display system in network communication with the on-board management system;
   the on-board management system having a server and a vehicle wireless communication module configured to establish a wireless communication link with the PED;
   the in-seat display system having a video monitor installed at the seat in the vehicle;
   wherein the on-board video system is configured to (a) communicate a light identification associated with the seat via a pulse width modulation communication produced by modulating a backlight of the monitor, (b) receive, via the wireless communication link, pairing information from the PED including (1) a light identification code generated by the PED based on the light identification as received by an imaging device of the PED, the light identification code corresponding to the light identification, and (2) a PED identifier identifying the PED, (c) determine whether the light identification code received from the PED is valid, and (d) pair the PED to the seat and authorize the PED to control at least one passenger seat function associated with the seat when the light identification code received from the PED is determined to be valid.

2. The system of claim 1, wherein the light identification corresponds to a seat code associated with the seat and the light identification code received from the PED is a conversion of the light identification received by the PED to the seat code, and the on-board video system determines whether the light identification code is valid by determining whether the light identification code matches the seat code.

3. The system of claim 1, wherein the on-board video system is configured to block any other PED from using the light identification to pair to the seat after receiving from a first PED a light identification code corresponding to the light identification.

4. The system of claim 1, wherein the on-board video system is configured to assign a seat code to the seat, and generate the light identification based on the seat code.

5. The system of claim 1, further comprising:
   a device pairing software application stored on a non-transitory computer program carrier and configured to program the PED to receive the light identification using the imaging device on the PED, convert the light identification into a light identification code, transmit the pairing information including the light identification code and the PED identifier to the on-board management system via the wireless communication link, and transmit a control instruction to control the at least one passenger seat function.

6. The system of claim 1, wherein the on-board video system is further configured to:
   receive passenger identification data from the PED via the wireless communication link;
   store passenger manifest data including each passenger identity associated with a respective assigned passenger seat;
   determine, using the passenger manifest, whether the passenger identification data and the seat associated with the light identification correspond to a passenger identity and associated assigned passenger; and
   only pair the PED to the seat and authorize the PED to control at least one passenger seat function associated with the seat when the passenger identification data and the seat associated with the light identification correspond to a passenger identity and associated assigned passenger.

7. The system of claim 1, further comprising a seat function controller installed in the vehicle and configured to control the at least one passenger seat function based upon a control instruction transmitted from the PED.

8. The system of claim 7, wherein the seat function controller comprises a passenger services system in communication with the on-board management system, the passenger services system configured to control the at least one passenger seat function based upon a management system instruction received from the on-board management system which is based upon the control instruction received from the personal electronic device.

9. The system of claim 1, wherein the monitor is a smart monitor configured to execute at least one passenger seat function based upon a control instruction transmitted from the personal electronic device.

10. The system of claim 1, further comprising the PED of the passenger, the PED having a processor, memory, a storage device, an imaging device, a wireless communication module configured to establish a wireless communication link with the on-board management system, and a device pairing software application installed on the PED and configured to program the PED to receive the light identification using the imaging device, convert the light identification into the light identification code, transmit the pairing information including the light identification code and the PED identifier to the on-board management system via the wireless communication link, and transmit a control instruction to control the at least one passenger seat function.

11. The system of claim 1, wherein the on-board video system is further configured to control a seat function based upon a control instruction received from the PED via the wireless communication link.

12. The system of claim 1, wherein the at least one seat function comprises at least two or more of the following: an on-board entertainment system, an air conditioning system, a lighting system, a telephony communication system, an on-board drink or meal service request system, an attendant call system, a passenger status system, and a seat adjustment system.

13. A method for pairing a personal electronic device (PED) of a passenger with a seat in a vehicle and controlling a seat function for the seat, the method comprising:
   communicating from a monitor installed at the seat of the passenger a light identification associated with the seat via a pulse width modulation communication produced by modulating a backlight of the monitor;
   receiving, via a wireless communication link, pairing information from the PED including a light identification code corresponding to the light identification received by the PED and a PED identifier identifying the PED;
   determining whether the light identification code received from the PED is valid; and
   pairing the PED to the seat and authorizing the PED to control at least one passenger seat function associated with the seat when the light identification code received from the PED is determined to be valid.

14. The method of claim 13, wherein the light identification corresponds to a seat code associated with the seat and the light identification code received from the PED is a conversion of the light identification received by the personal electronic to the seat code, and determining whether the light identification code is valid comprises determining whether the light identification code matches the seat code.

15. The method of claim 13, further comprising:
   after pairing the PED to the seat, blocking any other PED from using the light identification to pair to the seat.

16. The method of claim 13, further comprising:
   after receiving from a first PED a light identification code corresponding to the light identification, blocking any other PED from using the light identification to pair to the seat.

17. The method of claim 13, further comprising assigning a seat code to the seat, and generating the light identification based on the seat code.

18. The method of claim 13, further comprising:
   receiving passenger identification data from the PED via the wireless communication link;
   storing passenger manifest data including each passenger identity associated with a respective assigned passenger seat;
   determining, using the passenger manifest, whether the passenger identification data and the seat associated with the light identification correspond to a passenger identity and associated assigned passenger; and
   only pairing the PED to the seat and authorizing the PED to control at least one passenger seat function associated with the seat when the passenger identification data and the seat associated with the light identification correspond to a passenger identity and associated assigned passenger.

19. The method of claim 13, further comprising:
   receiving control instructions from the PED via the wireless communication link; and
   controlling the at least one passenger seat function based upon the control instructions received from the PED.

20. The method of claim 19, wherein the at least one seat function comprises at least two or more of the following: an on-board entertainment system, an air conditioning system, a lighting system, a telephony communication system, an on-board drink or meal service request system, an attendant call system, a passenger status system, and a seat adjustment system.

* * * * *